(12) United States Patent
Jenks et al.

(10) Patent No.: US 11,047,491 B2
(45) Date of Patent: Jun. 29, 2021

(54) THREE POSITION 270 DEGREE ACTUATOR

(71) Applicant: Johnson Controls Technology Company, Auburn Hills, MI (US)

(72) Inventors: Russell T. Jenks, Racine, WI (US); Gary A. Romanowich, Slinger, WI (US); Stephanie P. Lynn, Milwaukee, WI (US); Ralph L. Arndt, Jr., Racine, WI (US); Matthew A. Ward, Airdrie (CA)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/417,368

(22) Filed: May 20, 2019

(65) Prior Publication Data
US 2019/0353260 A1 Nov. 21, 2019

Related U.S. Application Data

(60) Provisional application No. 62/674,411, filed on May 21, 2018.

(51) Int. Cl.
*F16K 31/04* (2006.01)
*F16K 11/087* (2006.01)

(52) U.S. Cl.
CPC ........ *F16K 11/0873* (2013.01); *F16K 31/041* (2013.01)

(58) Field of Classification Search
CPC .. F16K 11/0873; F16K 31/041; F16K 31/055; F16K 31/605; F24F 2013/1446; F24F 2013/1433

(Continued)

(56) References Cited

U.S. PATENT DOCUMENTS 6,164,331 A * 12/2000 Sugita ................... F16K 31/041
137/625.43
6,220,566 B1 * 4/2001 Miller ..................... F25B 41/20
251/58

(Continued)

FOREIGN PATENT DOCUMENTS

CN 2679435 Y 2/2005
CN 203404422 U 1/2014

(Continued)

OTHER PUBLICATIONS

Office Action on CN 201910424034.6, dated Aug. 25, 2020, 16 pages with English translation.

*Primary Examiner* — Matthew W Jellett
(74) *Attorney, Agent, or Firm* — Foley & Lardner LLP

(57) ABSTRACT

An actuator controls the operation of a valve member to achieve desired flow or no-flow states through different inlet ports of the valve in response to different types of input signals from one or more input sources. In some embodiments, the actuator drives the valve member along a first portion of a travel path to regulate flow through a first inlet port using analog or binary input signal(s) from a first input source, and drives the valve member along a second portion of the travel path to regulate flow through a second inlet port using analog or binary input signal(s) from a second input source. In some embodiments the actuator drives the valve member along the entire travel path to regulate flow through each of the first inlet port and the second inlet port responsive to an analog input signal from a single input source.

20 Claims, 13 Drawing Sheets

(58) Field of Classification Search
USPC .................................................. 251/129.11
See application file for complete search history.

(56) References Cited

U.S. PATENT DOCUMENTS 9,677,717 B2 * 6/2017 Jenks .................. F16K 11/0873
2010/0018399 A1 * 1/2010 Barone ............... F16K 11/0876
96/122

FOREIGN PATENT DOCUMENTS

| CN | 204704435 U | 10/2015 |
|----|-------------|---------|
| CN | 106062447   | 10/2016 |
| EP | 2 941 580   | 11/2015 |

* cited by examiner

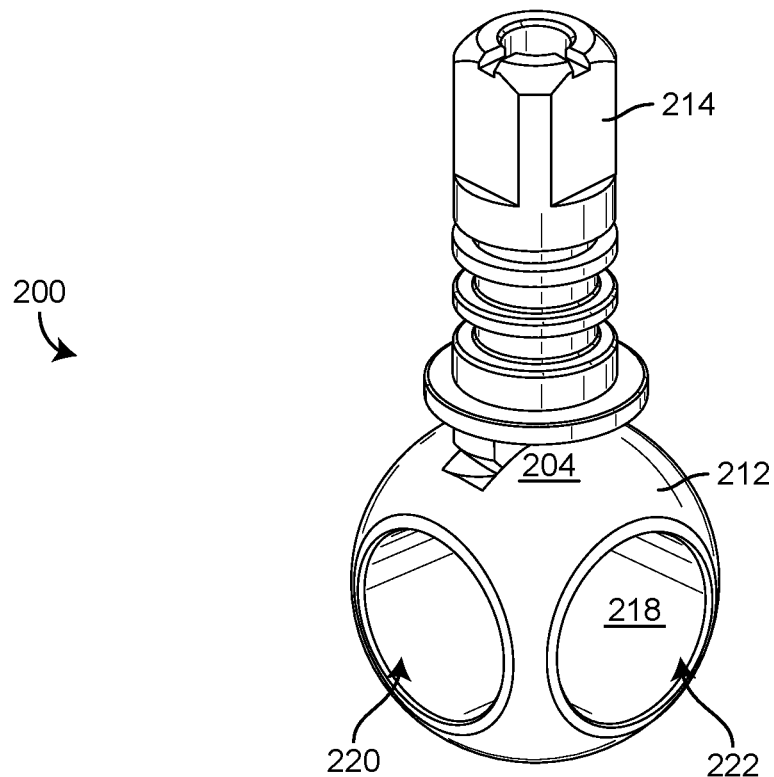
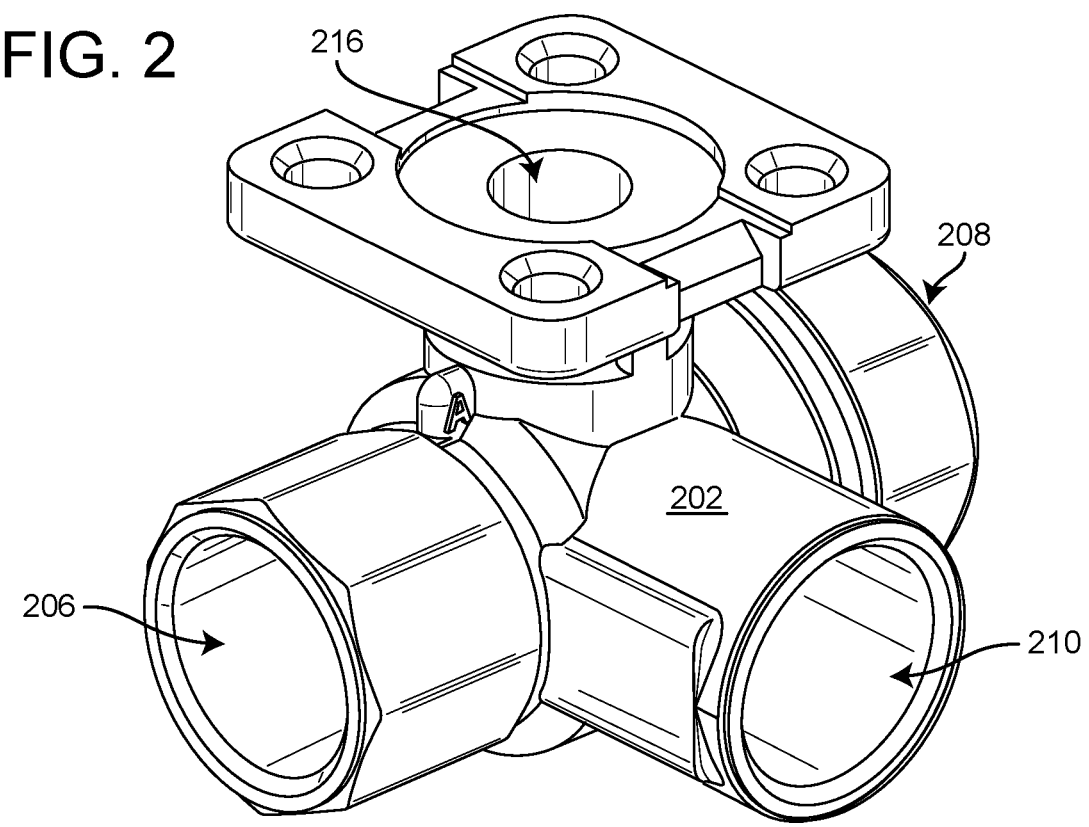
FIG. 2

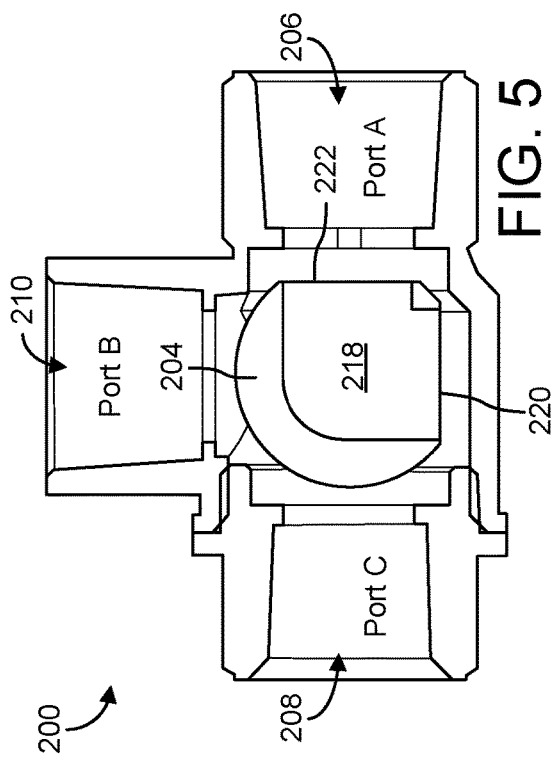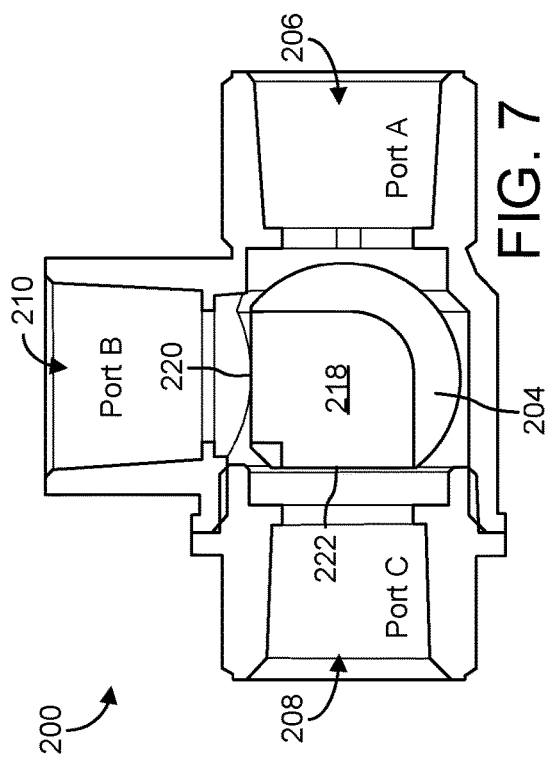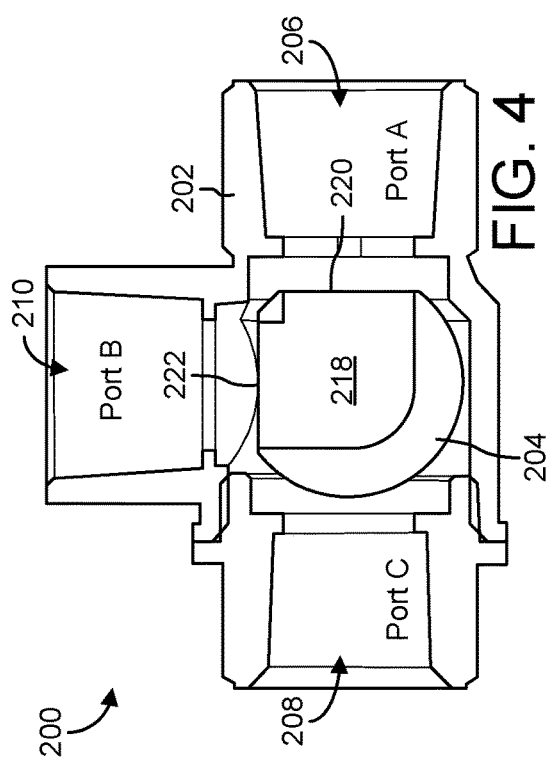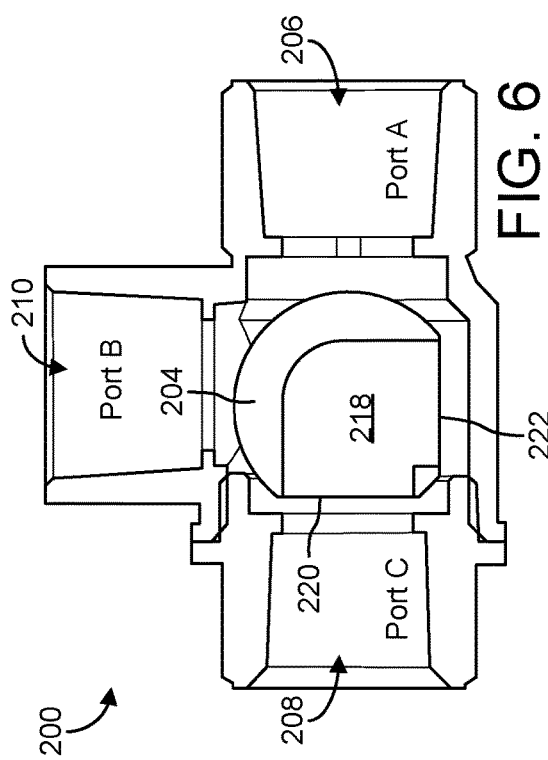

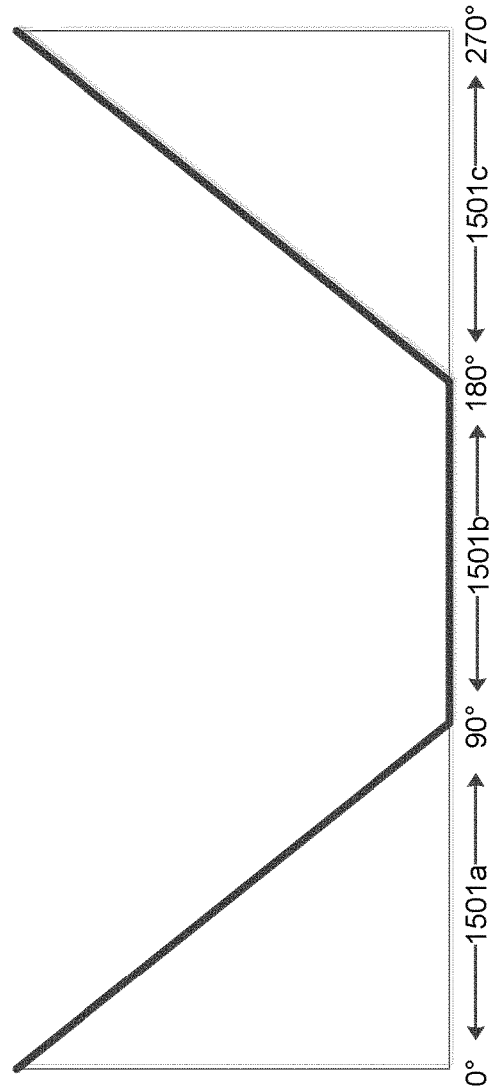
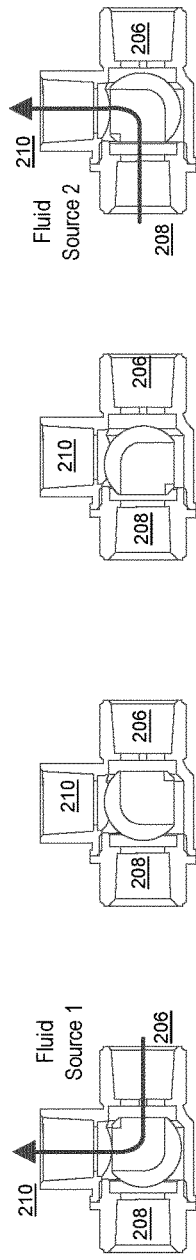
FIG. 15

| Clockwise Rotation | | | | |
|---|---|---|---|---|
| Valve Position | 0° | 90° | 180° | 270° |
| Fluid Source 1 | Full flow | No flow | No flow | No flow |
| Fluid Source 2 | No flow | No flow | No flow | Full flow |
| Input 1 (Y1) | 24 VAC | 0 VAC | 0 VAC | 0 VAC |
| Input 2 (Y2) | 0 VAC | 0 VAC | 0 VAC | 24 VAC |
| Counterclockwise Rotation | | | | |

| Clockwise Rotation | | | | |
|---|---|---|---|---|
| Valve Position | 0° | 90° | 180° | 270° |
| Fluid Source 1 | Full flow | No flow | No flow | No flow |
| Fluid Source 2 | No flow | No flow | No flow | Full flow |
| Input 1 (Y3) | 0(2) VDC | 4.5(5.6) VDC | 5.5(6.4) VDC | 10 VDC |
| Counterclockwise Rotation | | | | |

THREE POSITION 270 DEGREE ACTUATOR

CROSS-REFERENCE TO RELATED PATENT APPLICATIONS

This application claims the benefit of and priority to U.S. Provisional Patent Application No. 62/674,411, filed May 21, 2018, the entire disclosure of which is incorporated by reference herein.

BACKGROUND

Valves are devices that regulate, direct, and/or control the flow of a fluid (e.g., gases, liquids, fluidized solids, slurries, etc.) by opening, closing, or partially obstructing various passageways. Valves are often categorized based on the mechanism used to control fluid flow (e.g., ball valves, butterfly valves, choke valves, piston valves, plug valves, poppet valves, etc.).

Ball valves are a type of valve that typically include a spherical disc or valve member carried within a valve body. The spherical valve member includes a passage that can be selectively aligned with ports in the valve body by rotating the valve member relative to the valve body. When the passage aligns with one port and any number of the remaining ports, the valve is said to be in the open position. When the passage is out of alignment with the ports, the valve is said to be in the closed position. Ball valves are categorized as "quarter-turn" valves because a ninety degree rotation of the valve member (i.e., a quarter turn) is typically used to transition the valve between the open position and the closed position.

Ball valves can be classified based on the number of connections formed by the valve (e.g., two-way valves, three-way valves, etc.), the shape of the passage through the spherical valve member (e.g., L-shaped, T-shaped, X-shaped, etc.), and the size of the passage through the valve member (e.g., full bore, reduced bore, etc.). Three-way ball valves are often used to switch between two separate fluid supplies and/or returns.

Conventional three-way ball valves do not transition between supplies and/or returns without mixing. In a conventional three-way ball valve, rotating the valve member typically causes the flow rate of one fluid supply to be incrementally increased while the flow rate of another fluid supply is incrementally decreased. When the valve member is halfway rotated, the resulting fluid output is generally a mixture of the two fluid supplies.

SUMMARY

One implementation of the present disclosure is a valve assembly including a valve and an actuator. The valve defines a first inlet port, a second inlet port and an outlet port and a movable valve member disposed within a space defined between the first inlet port, the second inlet port and the outlet port. A passageway extends through the valve member. The valve member is movable from a first position in which the first inlet port is in fluid communication with the outlet port and a second position in which the second inlet port is in fluid communication with the outlet port. The actuator includes an input connection and a movable drive member. The drive member is configured to move the valve member into the first position upon receiving a first input from a first source and is configured to move the valve member into the second position upon receiving a second input from a second source. The valve member is configured to rotate by at least approximately 270 degrees as the valve member is rotated through a path between the first position and the second position. The first source is different than the second source.

According to some embodiments, the first source is a first discrete voltage signal and the second source is a second discrete voltage signal. The valve member is further movable to a third position in which neither the first inlet port nor the second inlet port in in fluid communication with the outlet port.

According to some embodiments, the third position lies along the path and in between the first position and the second position. According to some embodiments, the drive member is configured to rotate the valve member to the third position if neither the first discrete voltage signal nor the second discrete voltage signal is received by the actuator. According to some embodiments, the drive member is configured to rotate the valve member to the third position if both the first discrete voltage signal and the second discrete voltage signal are received simultaneously by the actuator.

According to some embodiments, the third position lies along the path between the first position and the second position at between approximately 80 degrees and 110 degrees from the first position. According to some embodiments, the valve further includes a valve stem that is attached to and extends from the valve member. A handle is attached to and extending from the valve stem. According to some embodiments, the valve handle is configured to rotate by approximately 180 degrees as the valve member is rotated through a path between the first position and the second position. According to some embodiments, the valve further includes a thermostat. The first source and the second source are each received by the actuator from the thermostat.

One implementation of the present disclosure is a valve assembly including a valve and an actuator. The valve defines a first inlet port, a second inlet port, an outlet port, and a movable valve member disposed within a space defined between the first inlet port, the second inlet port and the outlet port. A passageway extends through the valve member. The valve member is movable from a first position in which the first inlet port is in fluid communication with the outlet port and a second position in which the second inlet port is in fluid communication with the outlet port. The actuator includes an input connection and a movable drive member. The drive member is configured to move the valve member into the first position upon receiving a first input from a first source and is configured to move the valve member into the second position upon receiving a second input from a second source. The valve member is configured to rotate by at least approximately 270 degrees as the valve member is rotated through a path between the first position and the second position. The first source is the same as the second source.

According to some embodiments, the first source is an analog input. According to some embodiments, the first input corresponds to a first voltage and the second input corresponds to a second voltage, the first voltage being different than the second voltage. According to some embodiments, the valve member is further movable to a third position in which neither the first inlet port nor the second inlet port in in fluid communication with the outlet port. According to some embodiments, the third position lies along the path and in between the first position and the second position.

According to some embodiments, the drive member is configured to rotate the valve member to the third position in response to a third voltage being received from the analog input. According to some embodiments, the third position lies along the path between the first position and the second position at between approximately 80 degrees and 110 degrees from the first position.

According to some embodiments, the valve further includes a valve stem attached to and extending from the valve member. A handle is attached to and extends from the valve stem. According to some embodiments, the valve handle is configured to rotate by approximately 180 degrees as the valve member is rotated through a path between the first position and the second position.

One implementation of the present disclosure is a method of actuating a valve comprising: receiving a first input signal at an input connection of an actuator. In response to receiving the first input signal, a drive member of the actuator is driven to rotate a valve member along a drive path to a first position in which a passageway extending through the valve member extends between a first inlet port of the valve and an outlet port of the vale to establish fluid communication between the first inlet port and the outlet port. A second input signal is received at an input connection of an actuator. In response to receiving the second input signal, the drive member of the actuator is driven to rotate the valve member along the drive path to a second position in which the passageway extending through the valve member extends between a second inlet port of the valve and the outlet port of the vale to establish fluid communication between the second inlet port and the outlet port. The drive path extends between the first position and the second position and define an arc of approximately 270 degrees. The first input signal is a first discrete voltage received from a first source and the second input signal is a second discrete voltage received from a second source different than the first source.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 2 is an exploded view drawing illustrating the valve of FIG. 1 in greater detail, according to an exemplary embodiment.

FIGS. 4-7 are cross-sectional drawings of the valve of FIG. 2, showing the valve member at various rotational positions of a 270 degree rotation, according to an exemplary embodiment.

FIG. 15 is a table and diagram representative of the operation of an actuator, according to an exemplary embodiment.

DETAILED DESCRIPTION

Referring generally to the FIGURES, systems and methods for controlling fluid flow with a 270 degree rotatable valve are shown, according to various exemplary embodiments. The systems and methods described herein may be used to regulate fluid flow from multiple fluid supplies and/or to multiple fluid returns. In some embodiments, the valve is a three-way valve having a valve body and a 270 degree rotatable valve member. The valve body may include a valve chamber and a plurality of ports into the valve chamber (e.g., a first port, a second port, a third port, etc.). The valve member may have an L-shaped passage extending therethrough. The valve may be controlled (e.g., by an actuator and/or a controller) to rotate the valve member by approximately 270 degrees within the valve chamber.

Conventional three-way valves rotate by only 90 degrees to transition between fluid supplies or fluid returns and typically mix the fluid supplies/returns during the transition. To prevent mixing from occurring, conventional three-way valves often have a reduced-bore passage through the rotatable valve member (e.g., reduced relative to the pipelines connecting to the valve). A reduced-bore passage increases friction losses through the valve and causes a pump supplying fluid to the valve to work harder to maintain a satisfactory fluid flow. Advantageously, the systems and methods of the present disclosure use a valve that is rotatable by 270 degrees to switch between fluid supplies and/or fluid returns without mixing and without reducing the bore size.

Figure 1:
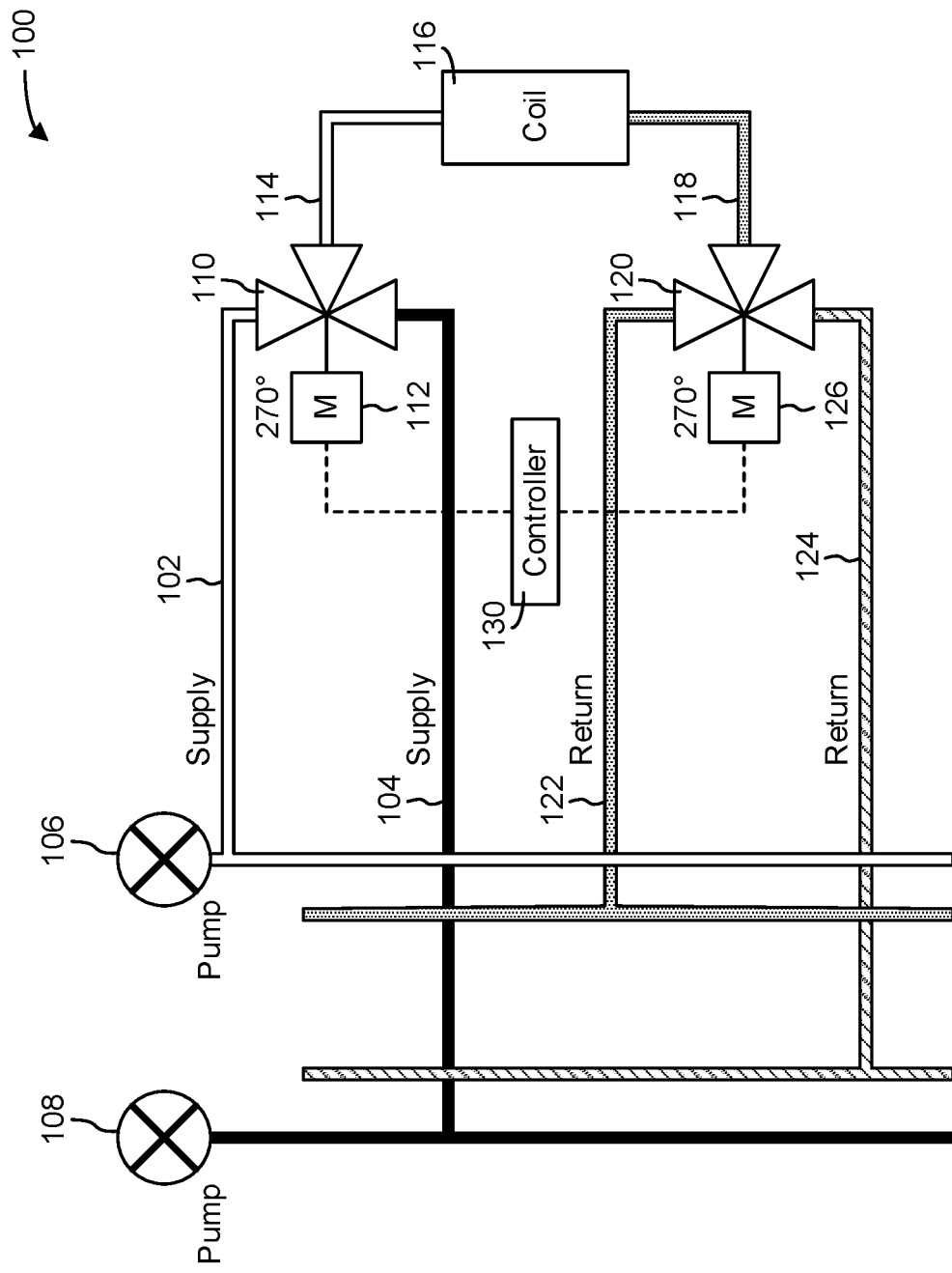
FIG. 1 is drawing of a fluid system including at least one valve configured to rotate by 270 degrees to switch, without mixing, between multiple fluid supplies and/or multiple fluid returns, according to an exemplary embodiment.

Referring now to FIG. 1, a fluid system 100 is shown, according to an exemplary embodiment. Fluid system 100 is shown to include a first fluid supply 102 and a second fluid supply 104. In some embodiments, fluid system 100 is a water manifold system. In a water manifold system, first fluid supply 102 may be cold water and second fluid supply 104 may be hot water. In other embodiments, first fluid supply 102 and second fluid supply 104 may be various fluids other than water (e.g., various types of gases, liquids, fluidized solids, slurries, etc.). First fluid supply 102 and second fluid supply 104 may have different temperatures (e.g., hot and cold water) or the same temperature.

First fluid supply 102 and second fluid supply 104 are shown connecting to a fluid control valve 110. Valve 110 may be a three-way valve configured to control an amount of first fluid supply 102 and second fluid supply 104 permitted to pass through valve 110 and into coil supply line 114. Valve 110 may be configured to rotate by 270 degrees to modulate a flow rate of first fluid supply 102 (e.g., during an initial 90 degrees of the 270 degree rotation) and of second fluid supply 104 (e.g., during a final 90 degrees of the 270 degree rotation) through valve 110 and into coil supply line 114.

Coil supply line 114 is shown connecting to a fan coil unit 116. Fan coil unit 116 may use the fluid from coil supply line 114 as a thermal reservoir from which heat energy can be absorbed (e.g., from hot water or another warm fluid) and/or into which heat energy can be rejected (e.g., into cold water or another coolant). Fan coil unit 116 may intake fluid from coil supply line 114 and output fluid to a coil return line 118.

Coil return line 118 is shown connecting to another fluid control valve 120. Valve 120 may be the same or similar to valve 110. For example, valve 120 may be a three-way valve configured to selectively divert fluid from coil return line 118 to either a first fluid return 122 or a second fluid return 124. Valve 120 may be configured to rotate by 270 degrees to modulate a flow rate between coil return line 118 and either first fluid return 122 or second fluid return 124 (e.g., without splitting or mixing). In some embodiments, first fluid return 122 is a cold water return and second fluid return 124 is a hot water return (e.g., for embodiments in which fluid system 100 is a water manifold system).

Figure 3:
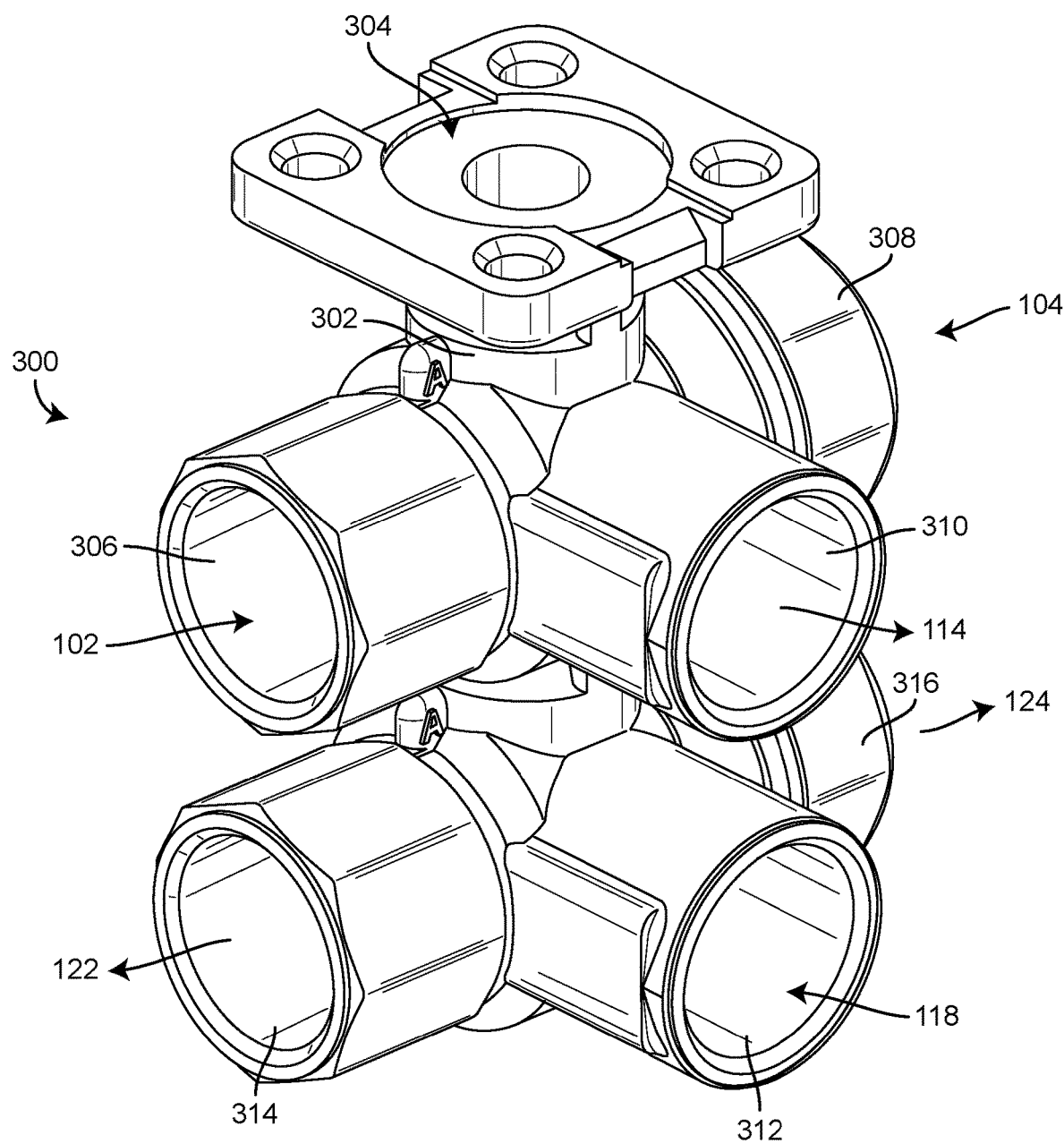
FIG. 3 is a perspective view drawing of a six-way valve configured to simultaneously switch between two fluid supplies and two fluid returns by rotating a single valve member, according to an exemplary embodiment.

Still referring to FIG. 1, fluid system 100 is shown to include a first actuator 112 and a second actuator 126. First actuator 112 may be rotatably coupled to valve 110 and configured to rotate valve 110 by 270 degrees. Second actuator 126 may be rotatably coupled to valve 120 and configured to rotate valve 120 by 270 degrees. In some embodiments, actuators 112 and 126 may be combined into a single actuator (e.g., for embodiments in which valves 110 and 120 are stacked or share a single valve member, as shown in FIG. 3). Actuators 112 and 126 may be electronic actuators configured to operate valves 110 and 120 in response to a control signal received from an electronic controller 130. In other embodiments, actuators 112 and 126 may be manual actuators (e.g., manually operable handles, wheels, etc.) or other devices for controlling a rotational position of valves 110 and 120.

Fluid system 100 is shown to further include fluid pumps 106 and 108. Pump 106 may be fluidly connected with first fluid supply 102 and pump 108 may be fluidly connected with second fluid supply 104. Pumps 106 and 108 may work to maintain first fluid supply 102 and second fluid supply 104 at a particular state or condition (e.g., a particular fluid pressure, flow rate, etc.). Pumps 106 and 108 may be operated by controller 130 (e.g., in response to a control signal received from controller 130), by a separate controller, or in response to a power signal or control signal received from any other source.

Controller 130 may be configured to operate actuators 112 and 126 to regulate fluid flow through fluid system 100. In some embodiments, controller 130 is configured to select either first fluid supply 102 or second fluid supply 104 to deliver to fan coil unit 116. Controller 130 may be configured to modulate a flow rate of first fluid supply 102 and second fluid supply 104 by adjusting a rotational position of valve 110 (e.g., via actuator 112). Controller 130 may be configured to direct the fluid output by fan coil unit 116 to either first fluid return 122 or second fluid return 124 and to control a flow rate of the return fluid by adjusting a rotational position of valve 120 (e.g., via actuator 126).

In some embodiments, controller 130 is a feedback controller configured to receive feedback signals from various sensors (e.g., temperature sensors, pressure sensors, flow rate sensors, position sensors, etc.). The sensors may be arranged to measure a flow rate, temperature, pressure, or other state or condition at various locations within fluid system 100. Controller 130 may operate actuators 112,126, and/or pumps 106-108 to achieve a setpoint for any variable state or condition measured or calculated from measured variables. An exemplary controller that may be used for controller 130 is described in greater detail with reference to FIG. 10.

Referring now to FIG. 2, an exploded view drawing of a fluid control valve 200 is shown, according to an exemplary embodiment. Valve 200 may be used as either or both of valves 110 and 120 in FIG. 1. Valve 200 is shown to include a valve body 202 and a valve member 204. Valve body 202 may include an internal valve chamber and a plurality of ports 206-210 into the valve chamber. For example, valve body 202 is shown to include a first port 206, a second port 208, and a third port 210. As shown, first port 206 and second port 208 may be inline ports (e.g., aligned with a common axis) and may be located on opposite sides of the valve chamber. In various embodiments, first port 206 and second port 208 may be located at a variety of different angles relative to each other (e.g., 180 degrees, 120 degrees, etc.). Third port 210 may be a transverse port (i.e., not inline with ports 206 and 208). As shown, third port 210 is substantially perpendicular to ports 206 and 208 and in the same plane as ports 206 and 208. In other embodiments, third port 210 may be oriented at a variety of different angles relative to ports 206 and 208 and may not be in the same plane as ports 206 and 208.

In some embodiments, valve body 202 is a three-way valve body having three ports (e.g., ports 206-210). A three-way valve body may be used to switch between either two fluid supplies or two fluid returns. For example, valve body 202 may be configured to receive a first fluid supply (e.g., first fluid supply 102) at first port 206 and a second fluid supply (e.g., second fluid supply 104) at second port 208. Valve body 202 may switch between the first fluid supply and the second fluid supply by selectively directing either the first fluid supply or the second fluid supply through the internal valve chamber and out third port 210. By controllably rotating valve member 204 within valve chamber, fluid control valve 200 can modulate a flow rate of the first fluid supply and/or the second fluid supply.

In some embodiments, valve body 202 may be configured to receive a fluid return at third port 210 (e.g., a return fluid output by fan coil unit 116). Valve body 202 may selectively deliver the fluid return to either first port 206 or second port 208 by rotating valve member 204.

In some embodiments, valve body 202 is a six-way valve body having six ports. A six-way valve body may combine two three-way valve bodies. For example, a second three-way valve body may be stacked above or below the three-way valve body shown in FIG. 2. A six-way valve body may be used to switch between both two fluid supplies and two fluid returns. The six-way valve body may use two separate valve members (e.g., for independently switching fluid supplies and fluid returns) or a shared valve member (e.g., for switching fluid supplies and fluid returns in unison). Advantageously, a six-way valve body may be controlled by a single actuator acting upon a single valve member. An exemplary six way valve body is described in greater detail with reference to FIG. 3.

In various embodiments, the plurality of ports 206-210 may include any number of ports (e.g., two ports, three ports, four ports, six ports, twenty ports, etc.). Ports 206-210 may be configured to connect to pipes, tubes, or other fluid control components. Ports 206-210 may be configured to connect with fluid pipelines using threading, compression fittings, glue, cement, flanges, welding, or other fasteners.

In some embodiments, the plurality of ports 206-210 are full size ports. A full size port may be defined as a port having a size that is greater than or equal to the size of the fluid pipeline connecting to the port. For example, if the pipeline connecting to a port has an internal diameter of two inches, the port may qualify as a full size port if the diameter of the port is at least two inches. In various embodiments, other size metrics (e.g., cross-sectional area, radius, circumference, etc.) may be used to quantify the size of fluid pipelines and/or ports. Advantageously, full size ports may result in improved flow rates (e.g., a higher maximum flow rate through valve 200), reduced friction losses, and reduced pressure drops relative to reduced size ports.

Valve body 202 may be made from any of a variety of materials including, for example, metals (e.g., cast iron, brass, bronze, steel, stainless steel, aluminum, etc.), plastics (e.g., PVC, PP, HDPE, etc.), glass-reinforced polymers (e.g., fiberglass), ceramics, or any combination thereof. The material or materials used to form valve body 202 may be based on the application for which valve body 202 is intended. For example, corrosion-resistant materials may be used for implementations in which valve body 202 is used with corrosive fluids (e.g., salt water, acidic fluids, etc.).

Still referring to FIG. 2, valve 200 is shown to include a valve member 204. In operation, valve member 204 may be located at least partially within the internal valve chamber. Valve member 204 may be controllably movable (e.g., in rotation, in linear movement, etc.) relative to valve body 202 to modulate fluid flow through valve 200. In some embodiments valve member 204 is configured to rotate by approximately 270 degrees relative to valve body 202. By rotating valve member 204, fluid flow can be selectively controlled (e.g., diverted, adjusted, increased, decreased, etc.) between the plurality of ports 206-210.

Valve member 204 is shown to include a disc 212 and a valve stem 214. In some embodiments, disc 212 is a substantially spherical ball and may characterize valve 200 as a ball valve. In other embodiments, disc 212 may be a cylinder (e.g., in a plug valve), a plate (e.g., in a butterfly valve), or have any other geometry or shape. Disc 212 may be located within valve 200 (e.g., within the internal valve chamber connecting ports 206-210) and may be controllably rotated to regulate fluid flow through valve 200.

In various embodiments, disc 212 may be fixedly attached to valve stem 214 or combined with valve stem 214 into a single component. Valve stem 214 may extend through valve body 202 (i.e., through hole 216) and connect to a handle or actuator for controlling the rotation of disc 212. In some embodiments, valve stem 214 connects multiple discs 212. For example, in a six-way valve, valve stem 214 may pass through valve body 202 and into another valve body. Valve stem 214 may be rotated (e.g., by a handle, by an automatic actuator, etc.) to adjust the rotational position of one or more discs 212.

Still referring to FIG. 2, disc 212 is shown to include a passage 218 therethrough. In some embodiments, passage 218 is L-shaped (e.g., having two openings and a single ninety degree bend). Passage 218 may be formed by drilling two bores into disc 212 at approximately 90 degrees relative to each other. The two bores may connect within disc 212 to form passage 218. In other embodiments, passage 218 may be T-shaped (e.g., having a main bore straight through disc 212 and a second bore extending perpendicularly from one side of the main bore), X-shaped (e.g., having two bores extending through disc 212 and intersecting at a ninety degree angle), or have any other shape.

Passage 218 may be controllably aligned (e.g., partially aligned, fully aligned, etc.) with ports 206-210 to form a fluid connection between pairs of ports. For example, passage 218 may be rotated into alignment with either first port 206 and third port 210, or second port 208 and third port 210. A port may be characterized as open (e.g., partially open, fully open, etc.) if one of the openings 220 or 222 into passage 218 aligns (i.e., overlaps) at least partially with the port. Conversely, a port may be characterized as completely closed if none of the openings 220 or 222 into passage 218 align at least partially with the port.

In some embodiments, passage 218 is a full-bore passage. A full-bore passage may be defined as a passage having a size (e.g., diameter, radius, cross-sectional area, etc.) that is at least the same size as the pipeline connecting to valve 200. A full-bore passage provides several advantages over a reduced-bore passage (i.e., a passage in which the size of the passage is less than the size of the pipeline connecting to the valve). For example, a full-bore passage may not restrict flow, thereby resulting in an improved flow rate potential (e.g., a faster maximum flow rate) and lower friction losses relative to a reduced-bore passage. Advantageously, fluid control valve 200 may include both a plurality of full-size ports 206-210 and a full-bore passage 218 (without a corresponding increase in valve size).

In some embodiments, the bore size of passage 218 (e.g., bore diameter) may be sufficiently large to span a distance between the plurality of ports 206-210. A single opening into passage 218 (i.e., either opening 220 or opening 222) may be capable of simultaneously overlapping at least partially with two or more of ports 206-210. For example, in FIG. 2, valve member 204 is shown with passage 218 aligned with ports 206 and 210. If valve member 204 were rotated by 90 degrees to move passage 218 out of alignment with ports 206 and 210 and into alignment with ports 208 and 210 (i.e., 90 degrees counterclockwise from a top down perspective), valve member 204 would rotate through a position (e.g., approximately halfway through the 90 degree rotation) in which openings 220 and 222 would simultaneously overlap with all three ports 206-210. For example, opening 220 would simultaneously overlap with both ports 206 and 210 and opening 222 would simultaneously overlap with both ports 208 and 210.

A simultaneous overlap between all three ports 206-210 may cause mixing to occur. For example, if all three ports 206-210 were at least partially open simultaneously, fluid from port 206 could mix with fluid from port 208 within passage 218 and exit valve body 202 through port 210. Conventional three-way valves typically include reduced-size ports and/or a reduced-bore passage in order to prevent such a simultaneous overlap from occurring.

Advantageously, fluid control valve 200 can be operated to prevent fluid mixing from occurring without reducing the size of ports 206-210 or the size of passage 218. For example, rather than rotating valve member 204 by 90 degrees as described above, valve member 204 can be rotated by 270 degrees in the opposite direction (e.g., 270 degrees clockwise from a top down perspective). The 270 degree backward rotation results in valve member 204 ending in the same rotational position as if valve member 204 were rotated forward by 90 degrees. However, the 270 degree backward rotation does not cause valve member 204 to rotate through any position in which all three ports 206-210 are at least partially open simultaneously.

In some embodiments, mixing may occur between ports 206 and 208 when valve member 204 is rotated approximately half way through the 270 degree rotation (e.g., by approximately 135 degrees). However, at the 135 degree rotational position, port 210 is maintained completely closed and any mixed fluid is prevented from exiting valve body 202 via port 210. The window for mixing is very small (e.g., a small window around the 135 degree rotational position) compared to traditional three-way valves and does not occur during a flow modulation portion of the rotation (e.g., between 0 and 90 degrees or between 180 and 270 degrees). For implementations in which the pressures of the fluids at ports 206 and 208 are balanced, the opportunity for mixing is further minimized.

In FIG. 2, the primary components of valve 200 are shown (i.e., valve body 202 and valve member 204). In some embodiments, valve 200 includes one or more additional components not explicitly shown in FIG. 2. For example, valve 200 may include gaskets, O-rings, seals, or other types of packing to prevent fluid leakage. In some embodiments, valve 200 includes a soft seat (e.g., a fitting within valve body 202 made from a relatively soft material such as a plastics or elastomers) to interface between valve body 202 and valve member 204. In some embodiments, valve 200 includes a spring to bias valve member 204 toward a particular rotational position. Valve 200 may include any number or type of additional trim and/or packing components as may be suitable for various implementations. These or other additional components added to valve 200 may reduce or eliminate the opportunity for fluid mixing at the 135 degree rotational position.

Referring now to FIG. 3, a drawing of a six-way valve 300 is shown, according to an exemplary embodiment. Six-way valve 300 is shown to include a six-way valve body 302 and a valve member 304. Six-way valve body 302 may combine two three-way valve bodies (e.g., valve body 202) in a stacked orientation. In the stacked orientation, a single valve member 304 can be used to control fluid flow through both of the three-way valve bodies. Advantageously, six-way valve body 300 may be controlled by a single actuator acting upon valve member 304.

Six-way valve 300 may be used to switch between both two fluid supplies and two fluid returns. For example, six-way valve 300 may be configured to receive first fluid supply 102 at first supply port 306 and to receive second fluid supply 104 at second supply port 308. Valve member 304 may be rotated by 270 degrees to selectively control fluid flow from either first supply port 306 or second supply port 308 to outlet port 310 (e.g., without mixing). Outlet port 310 may connect to fan coil unit 116 (e.g., via coil supply line 114). The fluid from outlet port 310 may pass through fan coil unit 116 and return to valve 300 at inlet port 312. Valve member 304 may be rotated by 270 degrees to selectively divert fluid from inlet port 312 to either first return port 314 or second return port 316. Return ports 314 and 316 may be fluidly connected to returns 122 and 124, respectively.

Referring now to FIGS. 4-7, four cross-sectional drawings of a fluid control valve are shown, according to an exemplary embodiment. The cross-sectional drawings may be cross-sections of a three-way fluid control valve (e.g., valve 200, as shown) or cross-sections of a six-way fluid control valve (e.g., valve 300). FIGS. 4-7 illustrate valve 200 with valve member 204 at various stages of a 270 degree rotation. By rotating valve member 204 by approximately 270 degrees between a first end position (shown in FIG. 4) and a second end position (shown in FIG. 7), valve 200 can modulate the flow of a first fluid between ports 206 and 210 and the flow of a second fluid between ports 208 and 210.

In various embodiments, the first fluid and the second fluid are the same fluid (e.g., hot water and cold water, etc.) or different fluids (e.g., different types of coolant, different types of refrigerant, etc.). In other embodiments, port 210 receives a single fluid that is selectively diverted to either port 206 or port 208. As used herein, the term "first fluid" identifies a fluid flow between ports 206 and 210, and the term "second fluid" identifies a fluid flow between ports 208 and 210.

Referring specifically to FIG. 4, valve member 204 is shown in a first end position. In the first end position, openings 220 and 222 into passage 218 may be completely aligned (i.e., at maximum overlap) with ports 206 and 210, respectively. In the first end position, ports 206 and 210 may be completely open and port 208 may be completely closed.

In the first end position, passage 218 forms a fluid connection between ports 206 and 210. The fluid connection between ports 206 and 210 allows a first fluid to flow therebetween (e.g., from port 206 to port 210 and/or from port 210 to port 206). When valve member 204 is in the first end position, the flow rate of the first fluid through valve body 202 may be at a maximum due to the maximum overlap of ports 206 and 210 with openings 220 and 222.

Referring now to FIG. 5, valve member 204 is shown in a first intermediate position. In some embodiments, the first intermediate position is approximately 90 degrees from the first end position (e.g., 90 degrees into the 270 degree rotation). Valve member 204 may be rotated into the first intermediate position by applying a torque to valve stem 214. For example, valve stem 214 may be attached to a user-operable handle or an automatic actuator (e.g., operable by a controller). The handle or actuator may be operated (i.e., rotated) to cause valve member 204 to rotate into the first intermediate position.

In the first intermediate position, opening 222 may be completely aligned with port 206 (i.e., at maximum overlap with port 206). However, as shown in FIG. 5, opening 220 may not be aligned completely or partially with any of ports 206-210. In the first intermediate position, port 206 may be completely open and ports 208-210 may be completely closed. When only one port is at least partially open, no flow occurs through valve body 202. Accordingly, no flow may occur through valve body 202 when valve member 204 is in the first intermediate position.

Valve 200 may be configured to modulate the flow rate of the first fluid (i.e., fluid flow between ports 206 and 210) by rotating valve member 204 between the first end position (shown in FIG. 4) and the first intermediate position (shown in FIG. 5). For example, when valve member 204 is rotated from the first end position into the first intermediate position (e.g., 90 degrees clockwise, from FIG. 4 to FIG. 5), the flow rate of the first fluid may be reduced from a maximum flow rate in the first end position to a zero flow rate in the first intermediate position. When valve member 204 is rotated from the first intermediate position into the first end position (e.g., 90 degrees counter-clockwise, from FIG. 5 to FIG. 4), the flow rate of the first fluid may be increased from a zero flow rate in the first intermediate position to a maximum flow rate in the first end position.

Advantageously, as valve member 204 is rotated between the first end position and the first intermediate position, port 208 may be maintained in a completely closed state. By maintaining port 208 in a completely closed state, the flow rate of the first fluid may be modulated (e.g., increased, decreased, adjusted, etc.) without forming a fluid connection between ports 208 and 210. The lack of a fluid connection between ports 208 and 210 prevents fluid flow between ports 208 and 210, thereby eliminating the potential for mixing.

Referring now to FIG. 6, valve member 204 is shown in a second intermediate position. In some embodiments, the second intermediate position is approximately 90 degrees from the first intermediate position and approximately 180 degrees from the first end position. Valve member 204 may be rotated into the second intermediate position by continuing to rotate valve member 204 in the same direction (e.g., clockwise in FIGS. 4-7) by approximately 90 degrees past the first intermediate position.

In the second intermediate position, opening 220 may be completely aligned with port 208. However, as shown in FIG. 6, opening 222 may not be aligned completely or partially with any of ports 206-210. In the second intermediate position, port 208 may be completely open and ports 206 and 210 may be completely closed. Accordingly, no flow may occur through valve body 202 when valve member 204 is in the second intermediate position. In some embodiments, both ports 206 and 208 are at least partially open during a transition between the first intermediate position and the second intermediate position.

Advantageously, as valve member 204 is rotated between the first intermediate position (shown in FIG. 5) and the second intermediate position (shown in FIG. 6), port 210 may be maintained in a completely closed state. By maintaining port 210 in a completely closed state, fluid is prevented from exiting valve body 202 (e.g., for implementations in which ports 206 and 208 are connected to first fluid supply 102 and second fluid supply 104, respectively) or entering valve body 202 (e.g., for implementations in which ports 206 and 208 are connected to fluid returns 122 and 124, respectively). As valve member 204 is rotated between the first intermediate position and the second position, no flow may occur through valve body 202 via port 210.

Referring now to FIG. 7, valve member 204 is shown in a second end position. In some embodiments, the second end position is approximately 90 degrees from the second intermediate position and approximately 270 degrees from the first end position. Valve member 204 may be rotated into the second end position by continuing to rotate valve member 204 in the same direction (e.g., clockwise in FIGS. 4-7) by approximately 90 degrees past the second intermediate position.

In the second end position, openings 220 and 222 into passage 218 may be completely aligned (i.e., at maximum overlap) with ports 210 and 208, respectively. In the second end position, ports 208 and 210 may be completely open and port 206 may be completely closed. In the second end position, passage 218 forms a fluid connection between ports 208 and 210. The fluid connection between ports 208 and 210 allows a second fluid to flow therebetween (e.g., from port 208 to port 210 and/or from port 210 to port 208). When valve member 204 is in the second end position, the flow rate of the second fluid through valve body 202 may be at a maximum due to the maximum overlap of ports 208 and 210 with openings 222 and 220, respectively.

Valve 200 may be configured to modulate the flow rate of the second fluid by rotating valve member 204 between the second end position and the second intermediate position. For example, when valve member 204 is rotated from the second intermediate position into the second end position (e.g., 90 degrees clockwise, from FIG. 6 to FIG. 7), the flow rate of the second fluid may be increased from a zero flow rate in the second intermediate position to a maximum flow rate in the second end position. When valve member 204 is rotated from the second end position into the second intermediate position (e.g., 90 degrees counter-clockwise, from FIG. 7 to FIG. 6), the flow rate of the first fluid may be decreased from a maximum flow rate in the second end position to a zero flow rate in the second intermediate position.

Advantageously, as valve member 204 is rotated between the second intermediate positions to the second end position, port 206 may be maintained in a completely closed state. By maintaining port 206 in a completely closed state, the flow rate of the second fluid may be modulated (e.g., increased, decreased, adjusted, etc.) without forming a fluid connection between ports 206 and 210. The lack of a fluid connection between ports 206 and 210 prevents fluid flow between ports 206 and 210, thereby eliminating the potential for mixing the first fluid and the second fluid.

In some embodiments, valve member 204 includes one or more stops defining a rotational range for valve member 204. The stops may permit valve member 204 to rotate only within a set rotational range. The ends of the rotational range may define the first end position and the second end position. In some embodiments, the stops are separated by approximately 270 degrees, thereby permitting valve member 204 to rotate by approximately 270 degrees between the first end position and the second position. In other embodiments, the first end position and the second end position may be separated by a greater or lesser number of degrees (e.g., 120 degrees, 180 degrees, 300 degrees, 315 degrees, etc.).

In some embodiments, valve member 204 does not include stops. Without stops, valve member 204 may be capable of rotating within valve body 202 by a full 360 degrees and/or indefinitely. In some embodiments, the rotational range for valve member 204 is defined by an external handle or actuator. For example, valve stem 214 may be connected to a user-operable handle (e.g., a lever, a wheel, etc.) for manually controlling the rotation of valve member 204 from outside valve body 202. The handle may include stops defining the rotational range of valve member 204.

In some embodiments, valve stem 214 is coupled to an actuator (e.g., actuator 112 or actuator 126) for automatically controlling the rotation of valve member 204. The actuator may be configured to rotate valve member 204 by approximately 270 degrees between the first end position and the second position. The actuator may be partially or completely automated and may be operated locally or remotely. In some embodiments, the actuator receives a control signal from a controller (e.g., controller 130) and operates valve 200 in response to the control signal received from the controller.

Figure 8:
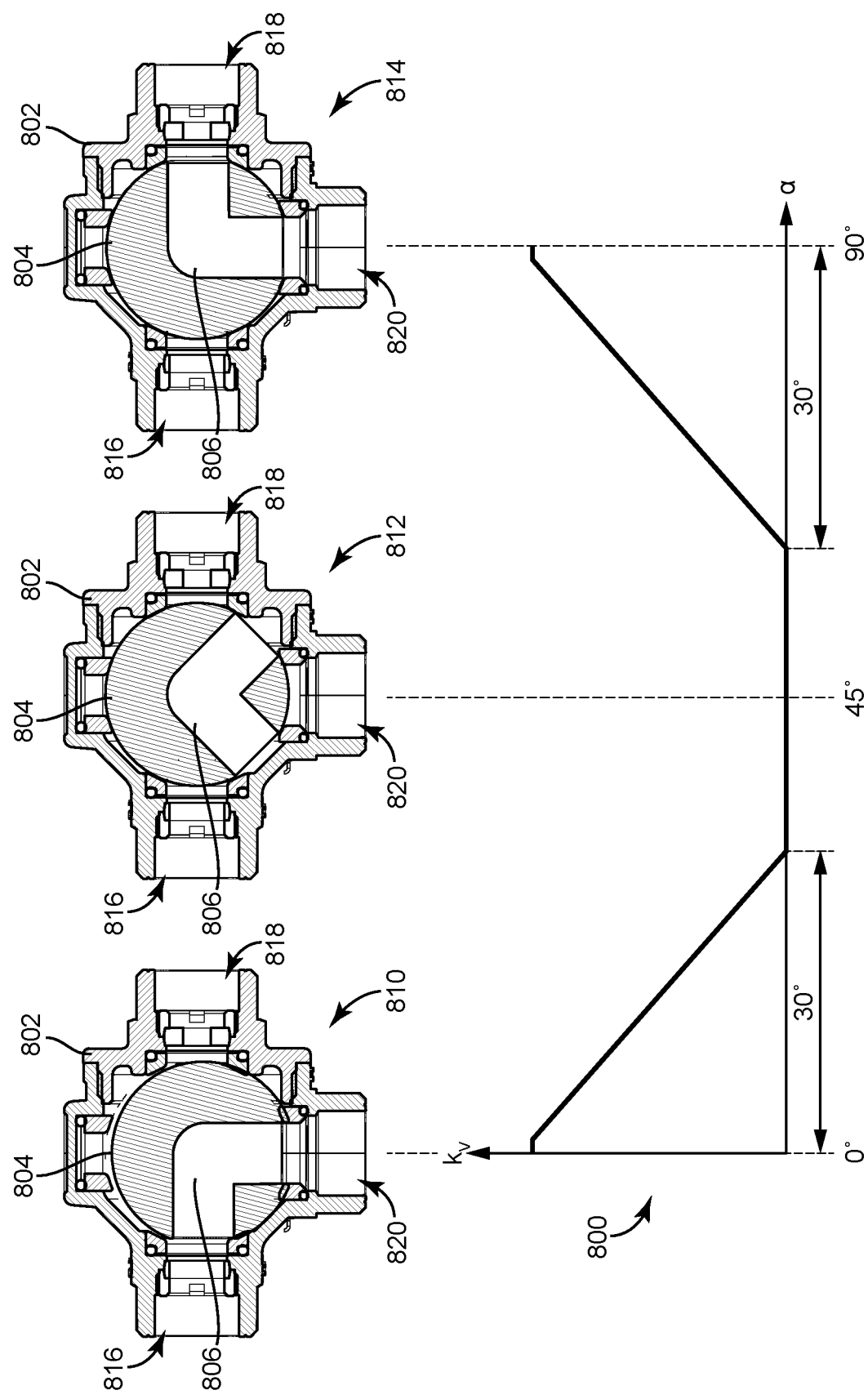
FIG. 8 is a flow diagram illustrating the flow control capability of a conventional valve assembly in which the valve member is rotated by only 90 degrees, according to an exemplary embodiment.
Figure 9:
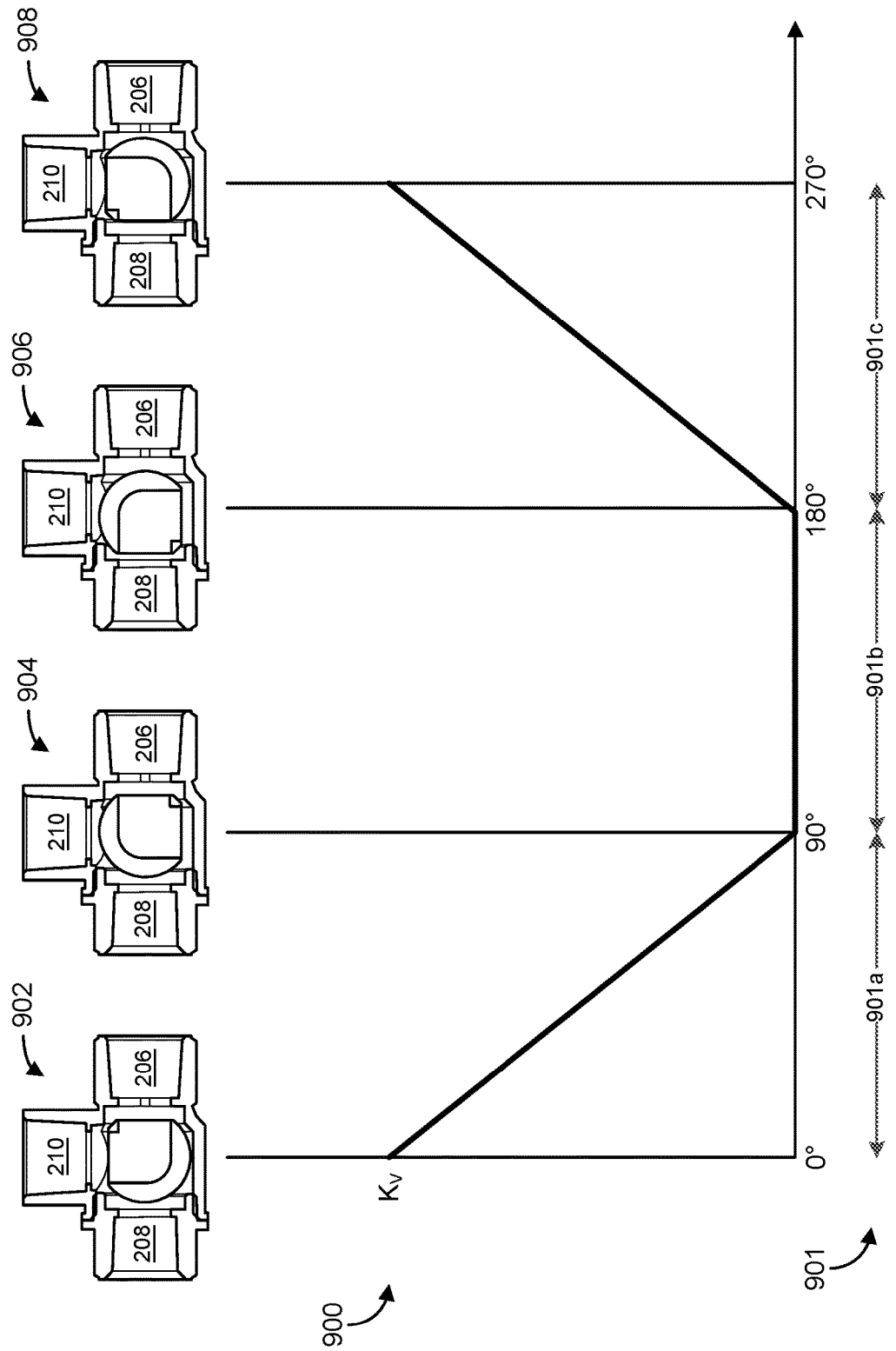
FIG. 9 is a flow diagram illustrating the improved flow control capability provided by the valve of FIG. 2 in which the valve member is rotated by 270 degrees, according to an exemplary embodiment.

Referring now to FIGS. 8-9 a pair of flow diagrams 800 and 900 are shown, according to an exemplary embodiment. Referring specifically to FIG. 8, flow diagram 800 illustrates the flow control ability of a conventional fluid control valve 802. Valve 802 is operated by rotating valve member 804 by 90 degrees between a first end position 810 and a second end position 814.

In order to prevent mixing from occurring, passage 806 through valve member 804 has a reduced bore size relative to the size of the fluid pipelines connecting to valve 802. The reduced bore size prevents fluid mixing when valve member 804 is in an intermediate position 812 between first end position 810 and second end position 814. However, the reduced bore size increases friction losses and requires a greater upstream pressure to cause fluid flow through valve 802.

Still referring to FIG. 8, fluid flow through valve 802 can be controlled by rotating valve member 804 by a total of 90 degrees. Fluid flow between ports 816 and 820 is controlled by rotating valve member 804 approximately 30 degrees from first end position 810 toward intermediate position 812. Fluid flow between ports 818 and 820 is controlled by rotating valve member 804 by approximately 30 degrees from second end position 814. With valve 802, fluid flow can be adjusted between a maximum flow rate (i.e., at end positions 810 and 814) and a zero flow rate, by rotating valve member 804 by 30 degrees. The 30 degree separation between maximum and minimum flow causes a relatively small rotation of valve member 804 to result in a relatively large change in flow rate. It may be difficult to achieve a desired flow rate with valve 802 due to the relatively large change in flow rate resulting from a small rotation of valve member 804.

Referring specifically to FIG. 9, flow diagram 900 illustrates the improved flow control ability provided by fluid control valve 200. Valve 200 is operated by rotating valve member 204 by 270 degrees between a first end position 902 and a second end position 908. First end position 902 may correspond to the position shown in FIG. 4 and second end position 908 may correspond to the position shown in FIG. 7. Fluid flow between ports 206 and 210 can be controlled by rotating valve member 204 by approximately 90 degrees between first end position 902 and first intermediate position 904. First intermediate position 904 may correspond to the position shown in FIG. 5. Fluid flow between ports 208 and 210 can be controlled by rotating valve member 204 by approximately 90 degrees between second end position 908 and second intermediate position 906. Second intermediate position 906 may correspond to the position shown in FIG. 6.

As illustrated by the diagram 900 of FIG. 9, as valve 200 is rotated from the first end position 902 to the second end position 908 along a travel path 901 of the valve 200, the valve member 204 is first rotated through a first travel path portion 901a in which the valve 200 controls flow between the first port 206 and the third port 210. In particular, as the valve 200 is rotated from the beginning of the first travel path portion 901a (and corresponding beginning of the travel path 901), the first port 206 transitions from a fully open configuration (i.e. max/full flow configuration) at the first end of the first travel path portion 901a to fully closed configuration (i.e. a zero/no-flow configuration) upon reaching the first intermediate position 904 (which defines the second end of the first travel path portion 901a). As the valve 200 continues to be rotated and travel along the travel path 901, the valve 200 enters the second travel path portion 901b. As shown by the flow diagram 900, as the valve 200 travels through this middle, no-flow portion of the travel path 901, no fluid connection is provided between any of the ports 206, 208, 210.

Upon being rotated through the second travel path portion 901b and reaching the second intermediate position 906, continued rotation of the valve 200 moves the valve 200 through the third travel path portion 901c in which the valve 200 controls flow between the second port 208 and a third port 210. In particular, as rotation of the valve 200 brings the valve 200 into the third travel path portion 901c, the second portion 208 transitions between a fully closed configuration (i.e. a zero/no-flow configuration), to a fully open configuration (i.e. a max/full flow configuration) upon the valve 200 reaching the end of the third travel path portion 901c (and corresponding end of the travel path 901).

As also illustrated by the flow diagram 900 of FIG. 9, the configuration of the valve 200 defines a travel path 901 in which each of a clockwise (CW) rotation of the valve 200 as well as a counterclockwise (CCW) rotation of the valve 200 allow the valve 200 to reach a no-flow valve 200 orientation from an initial flow orientation of the valve 200. For example, when operating the valve 200 to control flow between the first port 206 and the third port 210, the valve 200 may be rotated in a CW direction to bring the valve 200 to a no-flow orientation, whereas when operating the valve 200 to control flow between the second port 208 and the third port 210, the valve 200 may be rotated in a CCW direction to bring the valve 200 to a no-flow orientation. The configuration of the valve 200 also defines a travel path 901 in which a full/max flow orientation of the valve 200 may be reached from an initial no-flow orientation of the valve 200 by rotating the valve 200 in either the CW or CCW directions. In particular, when in an initial no-flow orientation (e.g., when the valve 200 has a rotational orientation defined anywhere along the second travel path portion 901b), full/max flow between the first port 206 and the third port 210 may be attained by rotating the valve 200 in a CCW direction relative to the initial no-flow orientation, while a full-max flow between the second port 208 and the third port 210 may be attained by rotating the valve 200 in a CW direction relative to the initial no-flow orientation.

Advantageously, the 90 degree separation between maximum flow rate (i.e., at end positions 902 and 908) and zero flow (i.e., at intermediate positions 904 and 906) allows for a more gradual change in flow rate, relative to conventional valve 802. It may be easier to achieve a desired flow rate with valve 200 due to the relatively large separation (e.g., 90 degrees) between maximum and minimum flow. With valve 200, a desired flow rate can be achieved more accurately and precisely than with conventional valve 802. For example, a control system for valve 200 can tolerate a greater variation in actuator position while maintaining the flow rate through valve 200 within an acceptable (e.g., setpoint) range. This greater tolerance in actuator position allows less accurate and less expensive actuators to be used without sacrificing flow control precision.

Figure 10:
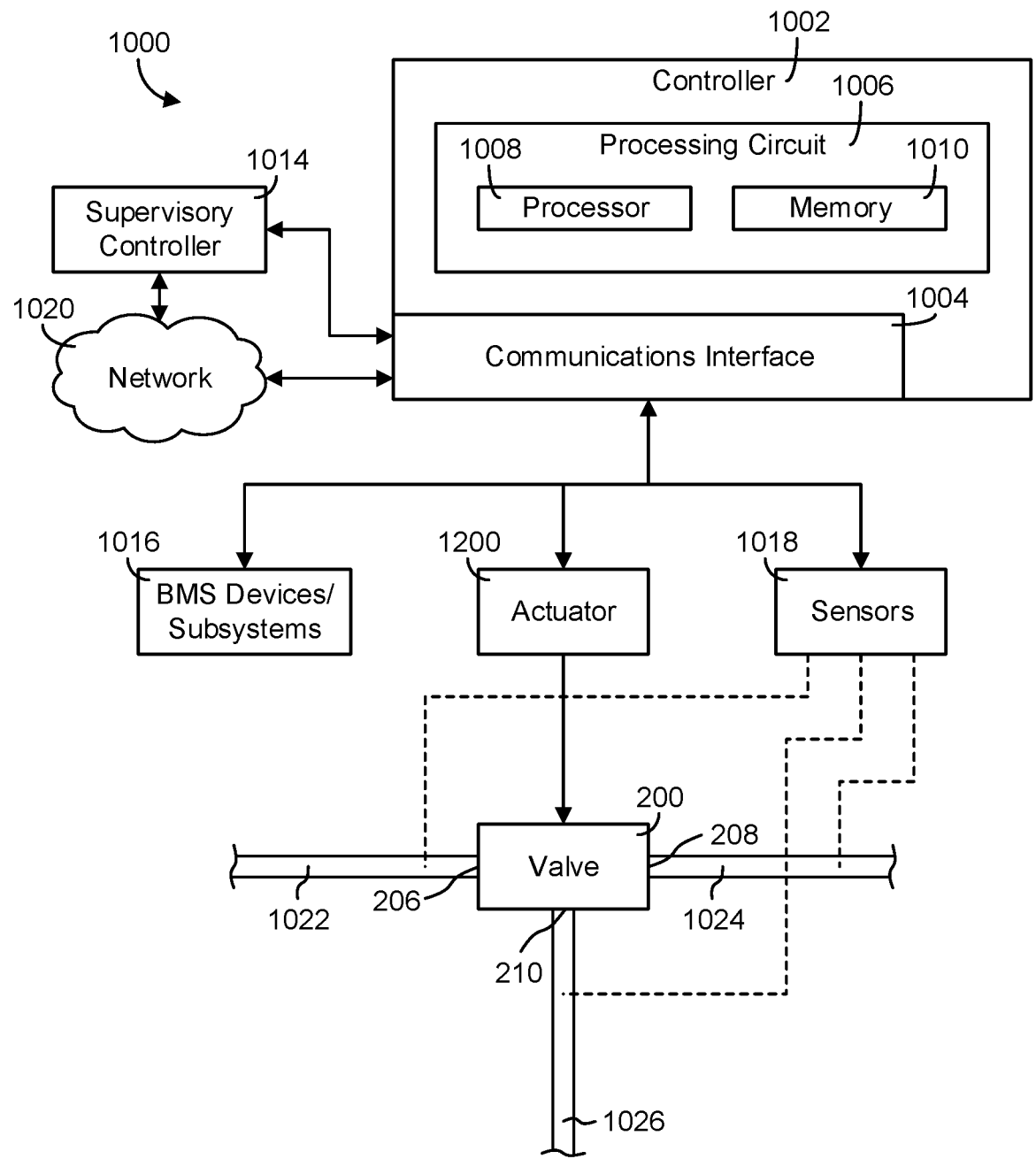
FIG. 10 is a block diagram of a control system configured to operate the valve of FIG. 2, according to an exemplary embodiment.

Referring now to FIG. 10, a block diagram of a control system 1000 is shown, according to an exemplary embodiment. Control system 1000 may be used to monitor and control any number of conditions, states, or variables of a controlled system (e.g., a building system, a plumbing system, a HVAC system, etc.) including, for example, the rotational position of fluid control valve 200.

In some embodiments, control system 1000 is a local control system (e.g., local to a building, building zone, building system, etc.). In other embodiments, control system 1000 is a distributed or remote control system. Control system 1000 may be used to control a single device (e.g., valve 200) or a plurality of devices (e.g., a chiller, boiler, air handling unit, damper, etc.). The plurality of devices may be located within a single building or building system or spread throughout several buildings or discrete building systems. In some embodiments, control system 1000 is part of a comprehensive building automation system such as a META-SYS® brand building automation system sold by Johnson Controls, Inc. In other embodiments, control system 1000 is a local control system for one or more valves and/or other HVAC devices.

Control system 1000 is shown to include a controller 1002 having a communications interface 1004 and a processing circuit 1006. Communications interface 1004 may include wired or wireless interfaces (e.g., jacks, antennas, transmitters, receivers, transceivers, wire terminals, etc.) for conducting data communications with, for example, actuator 1200, supervisory controller 1014, BMS devices/subsystems 1016, sensors 1018, or other external devices or data sources. Data communications may be conducted via a direct connection (e.g., a wired connection, an ad-hoc wireless connection, etc.) or via a communications network 1020 (e.g., an Internet connection, a LAN, WAN, or WLAN connection, etc.).

Communications interface 1004 may be configured to receive control signals from a supervisory controller 1014 (e.g., specific operating instructions, setpoint instructions, etc.), measurement signals from sensors 1018, and/or other types of electronic data communications from various building management system (BMS) devices or subsystems 1016. For example, communications interface 1004 may receive measurement signals from sensors 1018 indicating a state or condition (e.g., temperature, pressure, flow rate, etc.) of the fluids in pipelines 1022-1026. As shown in FIG. 10, pipelines 1022, 1024, and 1026 may connect to ports 206, 208, and 210, respectively.

Still referring to FIG. 10, controller 1002 is shown to include a processing circuit 1006 having a processor 1008 and memory 1010. Processor 1008 can be implemented as a general purpose processor, an application specific integrated circuit (ASIC), one or more field programmable gate arrays (FPGAs), a group of processing components, or other suitable electronic processing components.

Memory 1010 (e.g., memory device, memory unit, storage device, etc.) may include one or more devices (e.g., RAM, ROM, Flash memory, hard disk storage, etc.) for storing data and/or computer code for completing or facilitating the various processes, layers and modules described herein. Memory 1010 may include volatile memory or non-volatile memory. Memory 1010 may include database components, object code components, script components, or any other type of information structure for supporting the various activities and information structures described herein.

In some embodiments, controller 1002 is a feedback loop controller (e.g., a proportional gain controller, a proportional-integral (PI) controller, a proportional-integral-derivative (PID) controller, and adaptive gain controller, a pattern recognition adaptive controller (PRAC), a model predictive controller, etc.) Controller 1002 may be configured to monitor the fluids in pipelines 1022-1026 (e.g., using measurement signals received from sensors 1018). Controller 1002 may use the signals from sensors 1018 to operate fluid control valve 200 and to achieve a desired setpoint. For example, controller 1002 may be configured to operate fluid control valve 200 to achieve a temperature setpoint, a pressure setpoint, a flow rate setpoint, or any other type of setpoint received from supervisory controller 1014 or from a user device (e.g., via network 1020).

Controller 1002 may be configured to automatically operate fluid control valve 200 using an actuator 1200 rotatably coupled to valve stem 214 and configured to cause valve member 204 to rotate (e.g., by acting upon valve stem 214). Actuator 1200 may be any type of mechanism capable of acting upon valve 200 to cause a rotation of the valve member 204. For example, actuator 1200 may include an electric motor that is operable in response to a control signal from controller 1002 to cause a rotation of valve member 204. Actuator 1200 may be used as one or both of actuators 112 and 126 shown in FIG. 1. Additionally, actuator 1200 may be used to control either a single valve 200 (such as, e.g. shown in FIG. 2) or a stacked valve 300 (such as, e.g. shown in FIG. 3).

Figure 11:
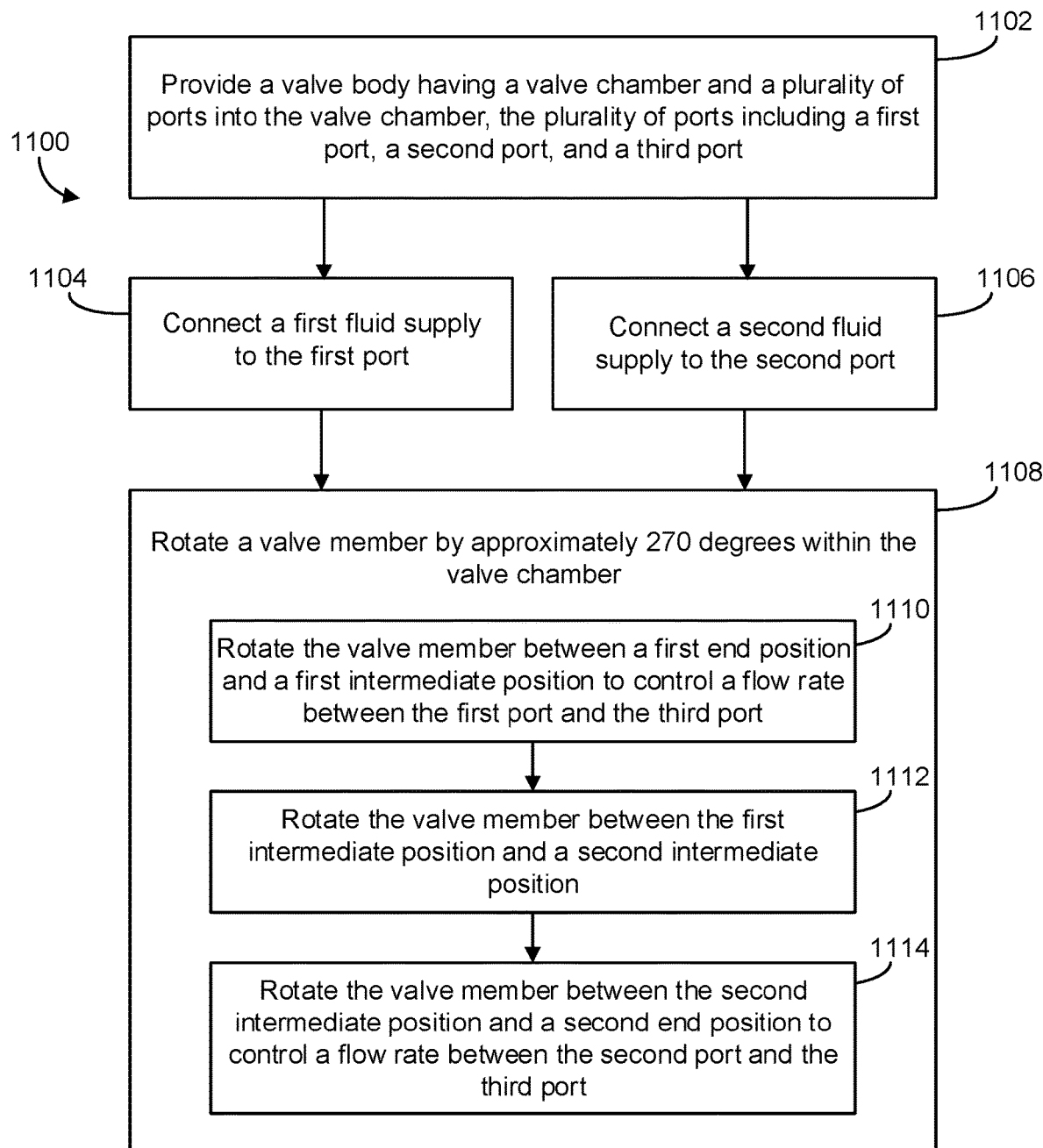
FIG. 11 is a flow chart of a process for controlling fluid flow, according to an exemplary embodiment.

Referring now to FIG. 11, a flowchart of one embodiment of a process 1100 for controlling fluid flow is shown, according to an exemplary embodiment. In some embodiments, process 1100 is performed by control system 1000 using controller 1002, actuator 1200, and/or fluid control valve 200 as described herein.

Process 1100 is shown to include the step 1102 of providing a valve comprising a valve body defining a valve chamber and a plurality of ports into the valve chamber. According to various embodiments, the valve may be a three-way valve (such as, e.g. valve 200 of FIG. 2), a six-way valve (such as, e.g., valve 300 of FIG. 3), or may define any other number of ports. In some embodiments, the plurality of ports may include a first port, a second port, and a third port, with the first port and the second port being aligned with a common axis and located on opposite sides of the valve chamber. In some embodiments, the third port is aligned with a second axis substantially perpendicular to the common axis. In some embodiments, the plurality of ports are full-size ports. For example, each of the plurality of ports may have a size (e.g., an area, a diameter, a radius, etc.) greater than or equal to the size of the fluid pipeline connecting to the port (i.e., a "full size" port).

Still referring to FIG. 11, process 1100 is shown to include at step 1104 fluidly connecting a first port of the valve body to a first fluid supply and at step 1106 fluidly connecting a second port of the valve body to a second fluid supply.

At step 1108, the valve member is rotated by approximately 270 degrees within the valve chamber. In some embodiments, the valve member is configured to rotate about an axis of rotation substantially perpendicular to both the common axis and the second axis. In some embodiments, the valve member includes a spherical disc component (i.e., a ball). In some embodiments, the valve may be a valve 200 having a valve member 204 as shown in FIG. 2.

The valve member may include an L-shaped fluid passage extending through the ball. The fluid passage may be formed by drilling two bores in the ball at 90 degrees relative to each other. The two bores may meet in the middle of the ball to form the fluid passage. In some embodiments, the bore size of the fluid passage (e.g., bore diameter, bore area, etc.) may be sufficiently large to span a distance between the plurality of ports. For example, a single opening into the fluid passage may be large enough to simultaneously overlap with two or more of the plurality of ports. In some embodiments, the passage is a full-bore fluid passage having a bore size (e.g., bore diameter, bore cross-sectional area, etc.) greater than or equal to the size of the fluid pipelines connecting to the valve body.

In some embodiments, the valve member is rotatably coupled to an actuator. In such embodiments, the actuator may be configured to perform step 1108 automatically in response to a control signal from a controller. The actuator may be designed to control the rotation of the valve member throughout the entire 270 degree rotational range. Conventional actuators typically rotate only 90 degrees and may require modification to be capable of performing step 1108. In some embodiments, the actuator is a specially designed actuator, customized to rotate 270 degrees, such as, e.g., actuator 1200 described herein.

Rotating the valve member by 270 degrees in step 1108 may allow the controller to independently modulate the flow rates of a first fluid (i.e., between the first port and the third port) and of a second fluid (i.e., between the second port and the third port). For example, modulating fluid flow between the first port and the third port may include regulating a flow rate of a first fluid supply to the third port. Modulating fluid flow between the second port and the third port may include regulating a flow rate of the second fluid supply to the third port.

In some embodiments, step 1108 includes rotating the valve member between a first end position in which the first port is fluidly connected with the third port and the second port is closed, and a second end position in which the second port is fluidly connected with the third port and the first port is closed. Rotating the valve member by approximately 270 degrees between the first end position and the second end position may include rotating the valve member through a first intermediate position approximately 90 degrees from the first end position and a second intermediate position approximately 90 degrees from the second end position. In some embodiments, when the valve member is in the first intermediate position and the second intermediate position, none of the plurality of ports are fluidly connected with one another.

Still referring to FIG. 11, step 1108 is shown to include a plurality of sub-steps 1110-1114. Each of sub-steps 1110-1114 corresponds to a rotation of the valve member between different portions of the 270 degree rotation travel path of the valve member. For example, sub-step 1110 is shown to include rotating the valve member between the first end position and the first intermediate position to control a flow rate between the first port and the third port. In some embodiments, sub-step 1110 is performed while maintaining the second port completely closed. Sub-step 1110 may correspond to a first 90 degrees of the 270 degree rotational travel path of the valve member, such as, e.g., representatively illustrated by the transition from the position shown in FIG. 4 to the position shown in FIG. 5. In sub-step 1110, the valve member may be rotated by approximately 90 degrees to transition between a maximum flow rate of the first fluid (e.g., in the first end position) and a zero flow rate of the first fluid (e.g., in the first intermediate position).

Step 1108 is shown to further include the sub-step 1112 of rotating the valve member between the first intermediate position and the second intermediate position. In some embodiments, sub-step 1112 is performed while maintaining the third port completely closed. Sub-step 1112 may correspond to a second 90 degrees of the 270 degree rotation, such as, e.g., representatively illustrated by the transition from the position shown in FIG. 5 to the position shown in FIG. 6. Throughout sub-step 1112, no flow may occur through the valve body through the third port. Although both the first port and the second port may be at least partially open at rotational position approximately halfway between the first end position and the second end position (e.g., approximately 135 degrees through the 270 degree rotation), the third port is maintained in a completely closed state, preventing fluid flow therethrough.

Step 1108 is shown to further include the sub-step 1114 of rotating the valve member between the second intermediate position and the second end position to control a flow rate between the second port and the third port. In some embodiments, sub-step 1114 is performed while maintaining the first port completely closed. Sub-step 1114 may correspond to a third 90 degree rotation of the 270 degree rotation, such as, e.g., representatively illustrated by the transition from the position shown in FIG. 6 to the position shown in FIG. 7. In sub-step 1114, the valve member may be rotated by approximately 90 degrees to transition between a maximum flow rate of the second fluid (e.g., in the second end position) and a zero flow rate of the second fluid (e.g., in the second intermediate position).

Advantageously, regulating the flow rates during step 1108 may occur without mixing the first fluid and the second fluid. For example, the flow rate of the first fluid may be regulated by rotating the valve member between the first end position (i.e., a maximum flow position for the first fluid) and the first intermediate potion (i.e., a zero flow position) while maintaining the flow rate of the second fluid supply at zero flow. The flow rate of the second fluid may be regulated by rotating the valve member between the second end position (i.e., a maximum flow position for the second fluid) and the second intermediate potion (i.e., a zero flow position) while maintaining the flow rate of the first fluid at zero flow.

The 270 degree rotation allows the flow rates for both the first fluid and the second fluid to be controlled throughout discrete 90 degree portions of the total 270 degree rotational range. By using a full 90 degrees to transition from maximum flow to minimum flow, the flow rates of the first and second fluid can be controlled more accurately and precisely than with traditional flow control valves and/or control processes.

The first port and the second port may be disposed at approximately equal distances and/or angles relative to the third port. For example, the first port and the second port may both be oriented at the same or approximately the same angle relative to the third port (e.g., 45 degrees, 60 degrees, 90 degrees, 120 degrees, etc.). The first port may be oriented at a particular angle relative to the third port in a first direction about an axis of rotation. The second port may be oriented at the same or approximately the same angle relative to the third port, but in a second direction about the axis of rotation opposite the first direction. The third port may be equidistant from the first port and the second port.

The valve member may be configured to rotate within the valve chamber to modulate fluid flow between the first port and the third port while maintaining the second port completely closed and to modulate fluid flow between the second port and the third port while maintaining the first port completely closed. The valve member may be configured to rotate by an amount approximately equal to a complete rotation less the angular difference in orientation between the third port and either the first port or the second port. For example, if the first port (or the second port) is oriented at approximately 90 degrees relative to the third port, the valve member may be configured to rotate by approximately 270 degrees (i.e., 360 degrees−90 degrees=270 degrees). If the first port (or the second port) is oriented at approximately 120 degrees relative to the third port, the valve member may be configured to rotate by approximately 240 degrees (i.e., 360 degrees−120 degrees=240 degrees). Rotating the valve member may regulate a flow rate of a first fluid supply from the first port to the third port and a flow rate of a second fluid supply from the second port to the third port without mixing the first fluid supply and the second fluid supply.

The controller may be configured to cause rotation of the valve member by a complete rotation, less the angle of the angled passage. For example, if the angled passage has a 90 degree angle, the controller may cause rotation of the valve member by 270 degrees (i.e., 360 degrees−90 degrees=270 degrees). If the angled passage has a 120 degree angle, the controller may cause rotation of the valve member by 240 degrees (i.e., 360 degrees−120 degrees=240 degrees).

The controller may be configured to rotate the valve member between a first position and a second position. The valve member can be rotated in either a first direction by a first number of degrees (e.g., 90 degrees, 120 degrees, etc.) to transition between the first position and the second position or in a second direction by a second number of degrees (e.g., 270 degrees, 240 degrees, etc.) to transition between the first position and the second position. The first number of degrees and the second number of degrees may sum to 360 degrees. The controller may be configured to rotate the valve member by the greater of the first number of degrees and the second number of degrees to transition between the first position and the second position.

Figure 12:
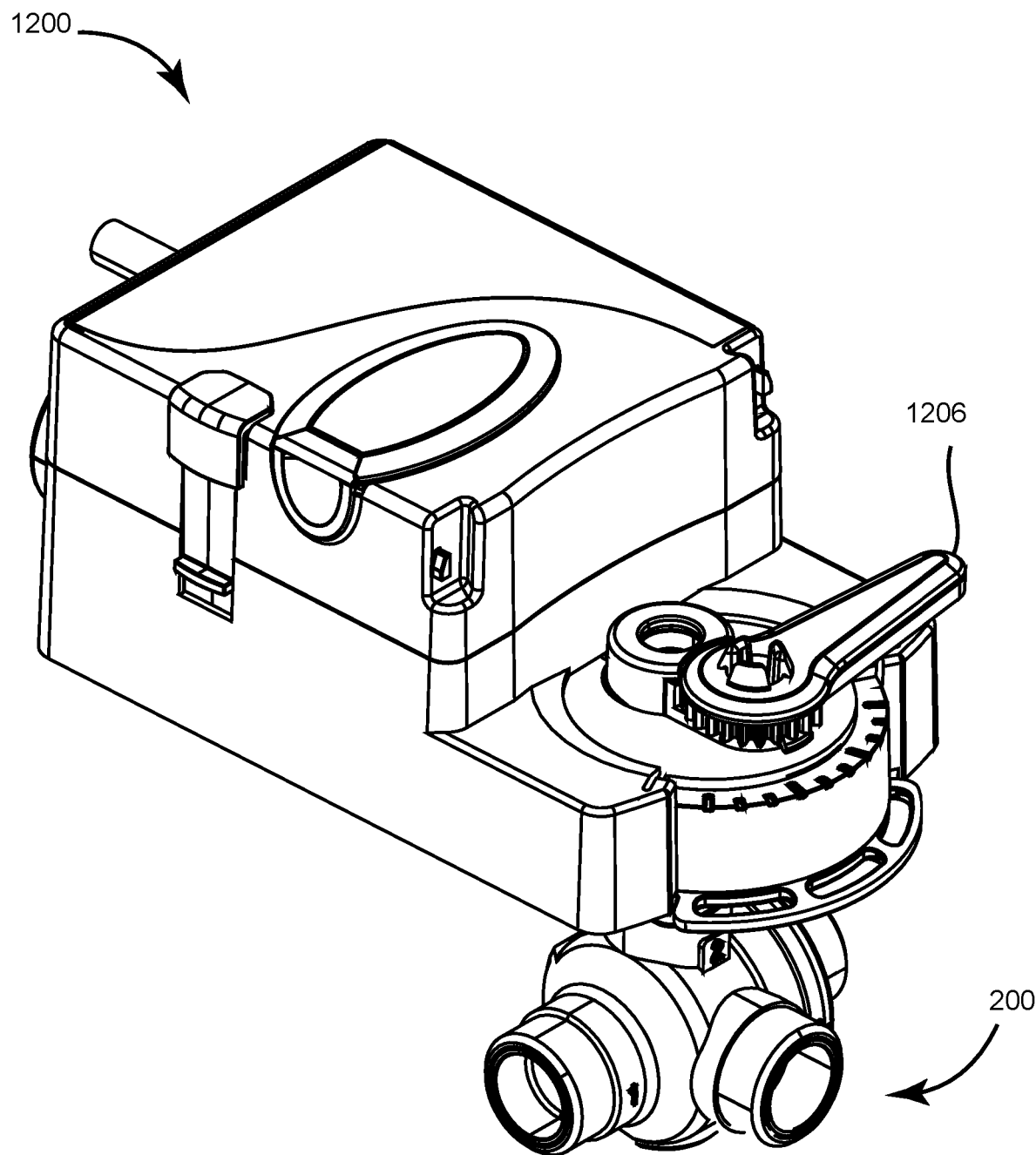
FIG. 12 is a perspective view drawing of an actuator coupled to the valve of FIG. 2, according to an exemplary embodiment.

Referring to FIG. 12, one embodiment of an actuator 1200 that may be used to controllably rotate the valve member 204 of a valve 200 according to any of the valve embodiments described herein (including, e.g., valves 110 and 120 of FIG. 1, valve 200 of FIG. 2, valve 300 of FIG. 3, etc.) by approximately 270 degrees is illustrated. As will be understood, however, the actuator 1200 of FIG. 12 may also be used with any number of different valve arrangements, including, e.g., valve arrangements having travel path ranges different than the approximately 270 degree range of the valve 200 described herein.

As illustrated by the embodiment of actuator 1200 of FIG. 12, a valve handle 1206 installed on the actuator 1200 may indicate the current position of the valve member 204. As depicted, the valve handle 1206 indicates which valve inlet, if any, is open to receive a fluid supply. In some embodiments, the valve handle 1206 also doubles as a manual override handle that may be used to move the drive shaft and valve position when power is not supplied to the actuator 1200, such as during an installation process or during a troubleshooting procedure.

Figure 14:
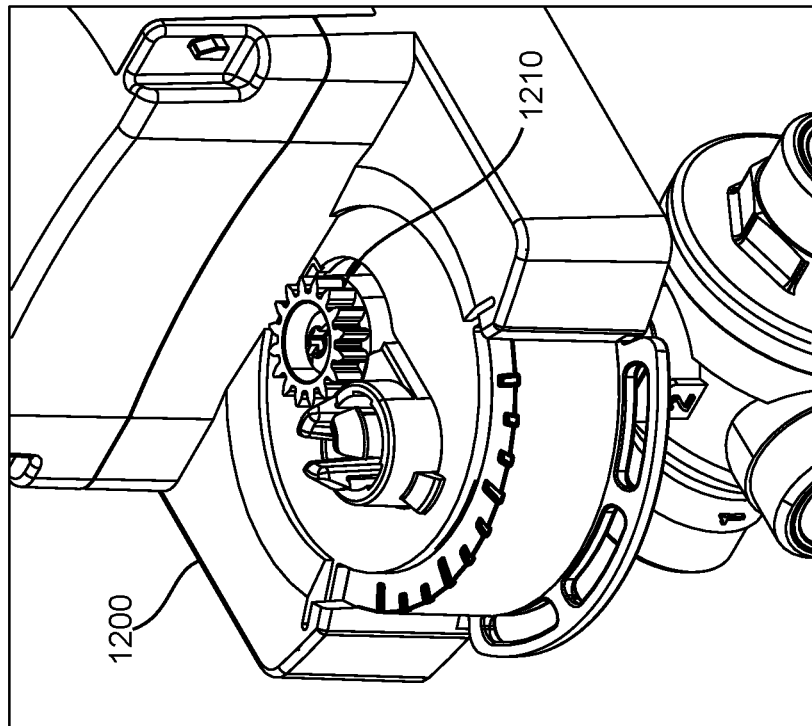
FIG. 14 is a perspective view drawing of the geared drive shaft of an actuator coupled to the valve of FIG. 2, according to an exemplary embodiment.
Figure 13:
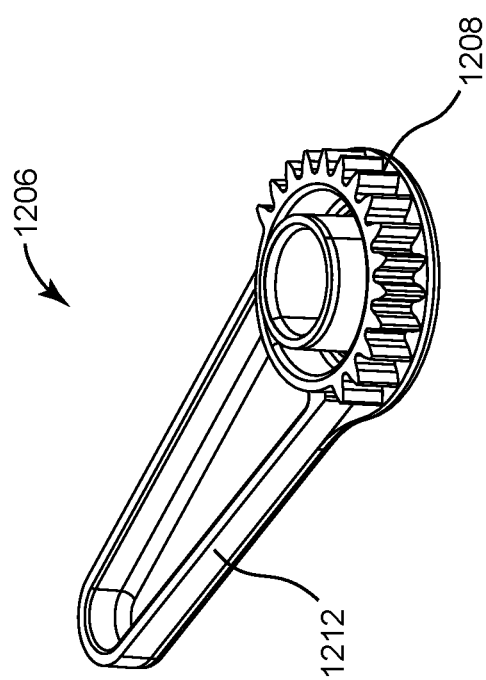
FIG. 13 is a perspective view drawing of a manual override handle, according to an exemplary embodiment.

Owing to the unique nature of a 270 degree valve 200, rotation of the valve handle 1206 and the valve stem 214 about the same axis of rotation and in the same direction as the valve stem 214 may be difficult to implement, as, due to a lack of clearance in the area in which the handle 1206 is installed on the actuator 1200, either the handle lever arm would be too short to be useable or the shaft of the handle 1206 would need to be excessively long to bring the handle 1206 above the highest point of the actuator 1200 in the travel path of the handle 1206. Accordingly, to overcome these issues, as depicted in FIGS. 12 and 13, the valve handle 1206 may include a set of handle gear teeth 1208 at a ratio of 2:3 with respect to the actuator gear teeth 1210 located on the output shaft of the actuator 1200. This gear ratio allows the handle 1206 to rotate 180 degrees while the output shaft rotates 270 degrees about a common axis of rotation but in the opposite direction, permitting the valve member 204 to travel its entire range of motion (i.e. along travel path 901) switching from port 206 and port 210 being fully open to port 208 and port 210 being fully open, and vice versa. Specifically referring to FIG. 13, the pointer handle 1206 (shown upside-down relative to its installation orientation) has a ledge 1212 to stop dust and debris from settling in the gearing mechanism when mounted upright. The handle 1206 mates with actuator gear teeth 1210 on the output shaft of the actuator 1200, specifically depicted in FIG. 14. In some embodiments, the handle gear teeth 1208 and the actuator gear teeth 1210 are complete spur gears, with a tooth 1210 count of twenty-four (for the shaft) and sixteen (for the handle 1206), resulting in the gear ratio stated above.

As described above, and as illustrated by FIG. 9, according to various embodiments a valve 200 with which the actuator 1200 may be used may define a travel path 901 in which a valve member 204 orientation corresponding to a fully open configuration of the first port 206 defines a first end of the travel path 901 and a valve member 204 orientation corresponding to a fully open configuration of the second port 208 defines a second end of the travel path 901. As the valve member 204 travels along the travel path 901 between the first end and the second end, the valve member 204 initially travels along a first travel path portion 901a. As the valve member 204 travels through the first travel path portion 901a, the degree to which the first port 206 is open decreases proportionally from the fully open first port 206 configuration defined at the first end of the first travel path portion 901a to a fully closed configuration of the first port 206 at the end of the first travel path portion 901a. Upon travelling through the first travel path portion 901a, the valve member 204 travels/rotates through additional no-flow orientations (in which each of the first port 206 and second port 208 are fully closed) as the valve member 204 is moved through the second travel path portion 901b. Upon exiting the second travel path portion 901b, the valve member 204 begins travelling through a third travel path portion 901c, along which the degree to which the second port 208 is open begins to increase from an initial no-flow, fully closed configuration of the second port 208. As the valve member 204 is rotated through the third travel path portion 901c, the degree to which the second port 208 is open continues to increase proportionally until the valve member 204 reaches the second end of the travel path 901, at which the second port 208 is defined by a fully open configuration.

Although the travel path 901 of the valve 200 has been described as defining a 270 degree travel path, according to other embodiments, the travel path may be defined by any other desired travel path rotational range of less than or equal to 360 degrees. In embodiments in which the travel path 901 is 360 degrees (or any other embodiments), rotational stops may be provided at one or both of the first end and second end of the travel path 901 so as to prevent the valve member 204 from being rotated past the first end and/or second end of the travel path 901.

Although the first travel path portion 901a, second travel path portion 901b and third travel path portion 901c have each been described as defining substantially equal portions of the travel path 901 (e.g. 90 degree portions), in other embodiments, one or more of the first travel path portion 901a, second travel path portion 901b and third travel path portion 901c may be defined by lengths that vary from that of the remaining portions of the travel path 901.

According to various embodiments, movement of the valve member 204 to regulate flow through the valve 200 is effectuated by the actuator 1200 in response to any combination of one or more input signals received by the actuator 1200 from any number of one or more input sources. The input signal(s) received from the input source(s) may cause the actuator 1200 to drive the valve member 204 to any one or more locations along some or all of the first travel path portion 901a, second travel path portion 901b, and/or third travel path portion 901c.

The locations along the travel path 901 to which the actuator 1200 is driven in response to the input signal(s) from the input source(s) may vary based on any number of conditions and variables. As one example, according to various embodiments, it may be desired that the valve member 204 be restricted to travel along a portion(s) of the travel path 901 that corresponds to less than a full range of the travel path 901. For example, in some embodiments it may be desired that the actuator 1200 limit the maximum flow to/from the first fluid supply source and/or the maximum flow to/from the second fluid supply source to less than the maximum flow that would occur in a fully open configuration of the first port 206 and/or second port 208.

In some embodiments, it may be desired that a minimum degree of flow to/from the first fluid supply source and/or the second fluid supply source corresponds to a no-flow, fully closed configuration of the first port 206 and/or second port 208. In such embodiments, the actuator 1200 may be configured to drive the valve member 204 to any desired no-flow valve member 204 position along the travel path 901 in response to input(s) from the input source(s). In other embodiments, the actuator 1200 may be configured to drive the valve member 204 to any desired combination of two or more no-flow valve member 204 positions along the travel path responsive to inputs from the input source(s). Alternatively, in some embodiments it may be desired that a minimum flow to/from the first fluid supply source and/or the second fluid supply corresponds to a non-zero degree of flow.

According to various embodiments, the input signal(s) received by the actuator 1200 may be VAC and/or VDC voltages of any desired magnitude. In some embodiments, a minimum input voltage that is supplied by the power source to control the actuator 1200 may correspond to a non-zero voltage (e.g. 2 VDC or 2 VAC), so as to distinguish an intentional 0V input signal from an unintentional 0V situation (e.g. a malfunctioning of the input/power source).

As illustrated by the actuator 1200 embodiments described with reference to FIGS. 15 and 16, in various embodiments the actuator 1200 may be configured to drive the valve member 204 based on input signals from a first input source Y1, and a second input source Y2 that is different from the first input source Y1. According to some such dual-input source actuator 1200 embodiments, when no input signal(s) is received from the Y2 input source, input signal(s) received from a first input source Y1 may generally be configured to control the flow of fluid from/to the first fluid source (e.g., by driving the valve member 204 to one or more positions along the first travel path portion 1501*a*, 1601*a* and optionally along the no-flow, second travel path portion 1501*b*, 1601*b*). When no input signal(s) is received from the Y1 input source, input signals from the Y2 input source by be generally configured to control flow of fluid from/to the second fluid source (e.g., by driving the valve member 204 to one or more positions along the third travel path portion 1501*c*, 1601*c* and optionally along the no-flow, second travel path portion 1501*b*, 1601*b*). As will be appreciated, according to various dual-input source actuator 1200 embodiments such as, e.g., the embodiments illustrated in FIGS. 15 and 16, inputs from each of the first input source Y1 and the second input source Y2 may be used to control the actuator 1200 to drive the valve member 204 in each of a first direction (e.g. CW) and a second, opposite direction (e.g. CCW).

Referring to FIG. 15, according to various embodiments, the actuator 1200 may be configured to control flow through the valve 200 based on dual analog inputs received from a first input source Y1 and a second input source Y2. As will be appreciated, the analog nature of the inputs from the first input source Y1 and second input source Y2 to allow the actuator 1200 to proportionally control the movement of the valve member 204 between a first travel range using input signals from the first input source Y1 and between a second travel range using input signals from the second input source Y2.

According to some such embodiments, the actuator 1200 may be configured to control movement of the valve member 204 along a first travel range that substantially corresponds to the first travel path portion 1501*a* in response to input signals received from the first input source Y1, and no input received from the second input source Y2. In such embodiments, a maximum input signal from the first input source Y1 (e.g., 10 VDC) corresponds to a fully open first port 206 configuration of the valve 200 (i.e. a 0 degree position along the travel path 1501) and a minimum input signal (e.g., 0V or 2 VDC) from the first input source Y1 corresponds substantially to the no-flow, fully closed first port 206 configuration defined at the end of the first travel path portion 1501*a*. For input signals from the first input source Y1 defined by intermediate voltages of a magnitude between the minimum voltage and maximum voltage (i.e., input signals with a voltage within the first input source Y1 input signal voltage range), the actuator 1200 may be controlled in a proportional manner along the first travel path portion 1501*a*, with such intermediate voltages corresponding to any number of intermediate valve member 204 orientations providing for partial flow through the first port 206 (e.g., as defined in Table 1 below).

In some such embodiments, the actuator 1200 may also be configured to control movement of the valve member 204 along a second travel range that corresponds to the third travel path portion 1501*c* in response to input signals received from the second input source Y2, and no input received from the first input source Y1. In such embodiments, a maximum input signal from the second input source Y2 (e.g., 10 VDC) corresponds to a fully open second port 208 configuration of the valve 200 (i.e. the end position of the travel path 1501, such as, e.g., 270 degrees), and a minimum input signal from the second input source Y2 corresponds substantially to the no-flow, fully closed first port 208 configuration defined at the first end of the third travel path portion 1501*c*. For input signals from the second input source Y2 defined by intermediate voltages of a magnitude between the minimum voltage and maximum voltage (i.e., input signals with a voltage within the second input source Y2 input signal voltage range), the actuator 1200 may be controlled in a proportional manner along the third travel path portion 1501*c*, with such intermediate voltages corresponding to any number of intermediate valve member 204 orientations providing for partial flow through the second port 208 (e.g., as defined in the Table 1 below).

The orientation to which the valve member 204 is driven in the event of no input from either the first input source Y1 or the second input source Y2 may be selected according to any number of different factors. For example, as shown by Table 1 below, in some embodiments, the valve member 204 orientation may depend on the input source Y1 or Y2 from which the last input was received by the controller. For example, in order to minimize energy usage, the no-input valve member 204 configuration may correspond to a no-flow orientation lying along the second travel path portion 1501*b* near a first end of the second travel path portion 1501*b* (i.e., the end of the second travel path portion 1501*b* closest to the first travel path portion 1501*a*) in the event that the last input was received from the first input source Y1, while the no-input valve member 204 configuration may correspond to a no-flow orientation lying along the second travel path portion 1501*b* near a second end of the second travel path portion 1501*b* (i.e., the end of the second travel path portion 1501*b* closest to the third travel path portion 1501*c*) in the event that the last input was received from the second input source Y2. Alternatively, in some embodiments the no-input valve member orientation may correspond to any desired no-flow or flow location along the travel path 901 (e.g. a no-flow valve member orientation equidistant between the first travel path portion 1501a and the third travel path portion 1501c, such as, e.g., 135 degrees).

As the actuator 1200 is not configured to be controlled via simultaneously received non-zero voltage inputs from the first input source Y1 and second input source Y2, as shown by Table 1 below, such a situation is treated as an error situation.

TABLE 1

| | |
|---|---|
| If Y1 Input; No Y2 Input | $x = \text{1st Travel Path Portion Range} \left(1 - \dfrac{\text{Y1 Voltage}}{\text{Y1 Voltage Range}}\right)$ |
| If No Y1 Input; No Y2 Input | x = 1st Travel Path Portion Second End Of Last Input Source Y1) <br> x = 3rd Travel Path Portion 1st End (If Last Input Source Y1) <br> OR <br> Travel Path 1st End ≤ x ≤ 5 Travel Path 2nd End |
| If No Y1 Input; Y2 Input | $x = \text{TTPR} - \text{3rd TPPR} \left(1 - \dfrac{\text{Y2 Voltage}}{\text{Y2 Voltage Range}}\right)$ <br><br> TTPR = Total Travel Path Range <br> TPPR = Travel Path Portion Range |
| If Y1 Input; Y2 Input | Error |

In contrast to the embodiments described above with reference to Table 1, in which a travel path of the first input source Y1 (defined between valve member 204 orientations corresponding to a maximum input voltage from a first input source Y1 and a minimum input voltage from the first input source Y1) corresponds to the first travel path portion 1501a of the valve 200, in other embodiments, a travel path of the first input source Y1 may vary from the first travel path portion 1501a. For example, according to some embodiments, it may be desired that a maximum flow of a fluid through the first port 206 correspond to a flow that is less than the flow corresponding to a fully open configuration of the first port 206. Alternatively, or additionally, it may be desired that a minimum flow of fluid through the first port 206 correspond to a non-zero flow. In yet other embodiments, it may be desired to ensure that the actuator 1200 is operable to entirely prevent flow through the first port 206, in which situations it may be desirable that the actuator 1200 drive the valve member 204 into a portion of the no-flow second travel path portion 1501b, so as to avoid situations in which slight variations in shape/size/configuration of the valve member 204 and/or valve body 202 and/or slight variations in the degree to which the valve member 204 is driven by the actuator 1200 may result in the first port 206 being substantially, but not entirely, closed at the end of the first travel path portion 1501a.

In such embodiments, the valve member 204 may be driven by the actuator 1200 in response to input signals from the first input source Y1 according to the equation provided in Table 2 below. In particular, in such embodiments, a first end of the travel path of the first input source Y1 (corresponding to a maximum input voltage from the first input source Y1) is defined by a location $x1_{Initial}$ along the valve 200 travel path 1501 corresponding to a valve member 204 orientation at which a desired maximum degree of flow through the first port 206 is attained. As also shown in Table 2, the $x1_{Initial}$ valve member 204 orientation corresponding to such a desired maximum degree of flow through the first port 206 is a function of the length of the first travel path portion 1501a, wherein a maximum degree of flow through the first port 206 of "1" corresponds to the fully open configuration of the first port 206 defined at the first end of the travel path 1501, a minimum degree of flow through the first port 206 of "0" corresponds to a fully closed configuration of the first port 206 as defined at the end of the first travel path portion 1501a, and intermediate degrees of flow through the first port 206 (i.e. values between "1" and "0") are defined proportionally between the ends of the first travel path portion 1501a.

As noted above, a second end of the travel path of the first input source Y1 (corresponding to a minimum input voltage from the first input source Y1) may be defined by either a location along the first travel path portion 1501a, or may be defined by any other location along the travel path 1501 of the valve 200. As discussed above, in some situations, it may be desired that a minimum input voltage from the first input source Y1 correspond to a non-zero minimum desired degree of flow through the first port 206. As shown in Table 2 below, in such embodiments, the end position $x1_{End}$ that defines the valve member 204 orientation corresponding to the minimum input voltage from the first input source Y1 may be determined as a function of the location along the first travel path portion 1501a corresponding to the desired minimum flow through the first port 206. Alternatively, in embodiments in which it is desired that the minimum input voltage from the first input source Y1 correspond to a no-flow valve member 204 orientation (defined by any other valve member 204 orientation anywhere along the travel path 1501 of the valve member 204), the second end position $x1_{End}$ of the travel path of the first input source Y1 may be defined by the desired no-flow valve member 204 orientation (or other desired orientation) along the travel path 1501.

As will be understood, in situations in which a travel path of the second input source Y2 (defined between valve member 204 orientations corresponding to a maximum input voltage from the second input source Y2 and a minimum input voltage from the first input source Y2) varies from the third travel path portion 1501c, the $x2_{Initial}$ valve member 204 orientation along the travel path 1501 corresponding to a maximum input voltage from the second input source Y2 and defining a first end of the travel path of the second input source Y2, and the $x2_{End}$ valve member 204 orientation along the travel path 1501 corresponding to a minimum input voltage from the second input source Y2 and defining a second end of the travel path of the second input source Y2 may be selected based on similar considerations as discussed with reference to the first input source Y1.

TABLE 2

| | |
|---|---|
| If Y1 Input; No Y2 Input | $x = x1_{End} + \frac{\Delta x1}{Y1 \text{ Voltage Range}}(Y1_{minvoltage} - Y1 \text{ Voltage})$ |
| | Where:<br>$\Delta x1 = x1_{End} - x1_{initial}$<br>$x1_{Initial}$ = 1st TPPR (1 − Max Desired 1st Port Flow)<br>AND<br>$x1_{End}$ = 1st TPPR (1 − Min Desired 1st Port Flow)<br>OR<br>$x1_{End}$ = Desired noflow (or other) Valve Member Oreintation<br>TPPR = Travel Path Portion Range |
| If No Y1 input; No Y2 Input | $x = x1_{End}$ (If Last Input Source Y1<br>$x = x2_{End}$ If Last Input Source Y1<br>OR<br>Travel Path 1st End ≤ x ≤ Travel Path 2nd End |
| If No Y1 Input; Y2 Input | $x = x2_{End} + \frac{\Delta x2}{Y2 \text{ Voltage Range}}(Y2 \text{ Voltage} - Y2_{minvoltage})$ |
| | Where:<br>$\Delta x2 = x2_{End} - x2_{initial}$<br>$x2_{Initial}$ = TTPR − 3rd TPPR (1− Max Desired 2nd Port Flow)<br>AND<br>$x2_{End}$ = TTPR − 3rd TPPR(1 − Min Desired 2nd Port Flow)<br>OR<br>$x2_{End}$ = Desired noflow (or other) Valve Member Oreintation<br>TTPR = Total Travel Path Range<br>TPPR = Travel Path Portion Range |
| If Y1 Input; Y2 Input | Error |

In some embodiments, the controller 1002 from which the actuator 1200 receives input(s) may comprise a thermostat controller. As many commonly used thermostats are not configured to output two analog inputs by which to control an actuator, according to various embodiments, the actuator 1200 may advantageously be configured to operate based on inputs other than two analog inputs. Additionally, as systems that require significant amount of analog signal processing are typically associated with higher costs than systems that require minimal or no analog signal processing, embodiments of actuator 1200 that operate based on inputs other than two analog inputs may advantageously provide for a more cost-effective actuator. Accordingly, described with reference to FIGS. 16 and 17 are embodiments of cost-efficient actuators 1200 that may be utilized with many existing thermostats (and/or other devices having controllers that outlet signals other than two analogs outputs).

Figure 16:
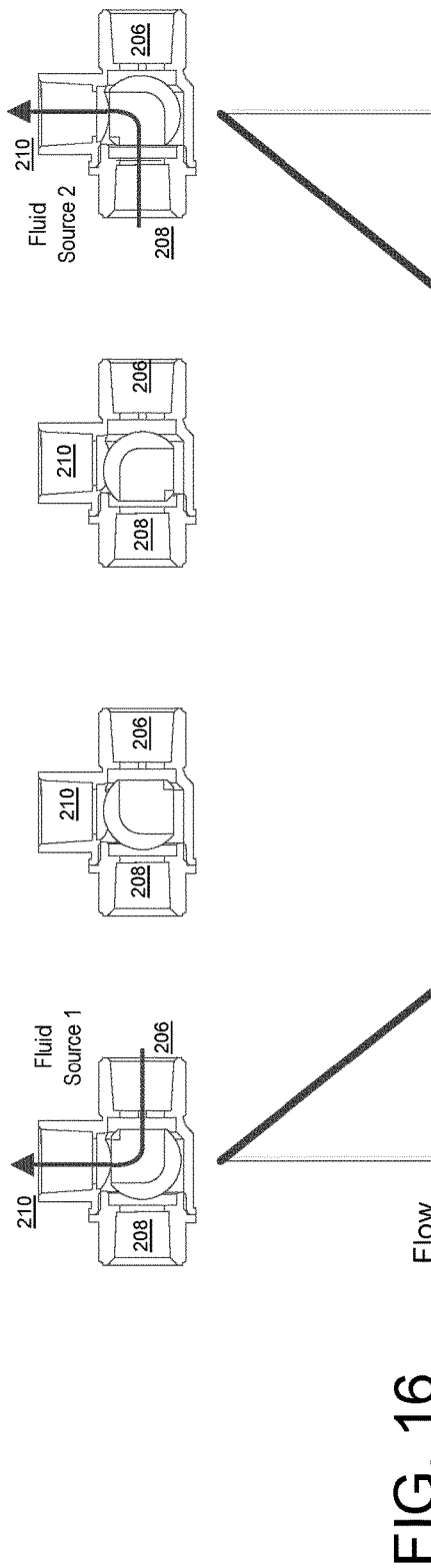
FIG. 16 is a table and diagram representative of the operation of an actuator, according to an exemplary embodiment.
Figure 17:
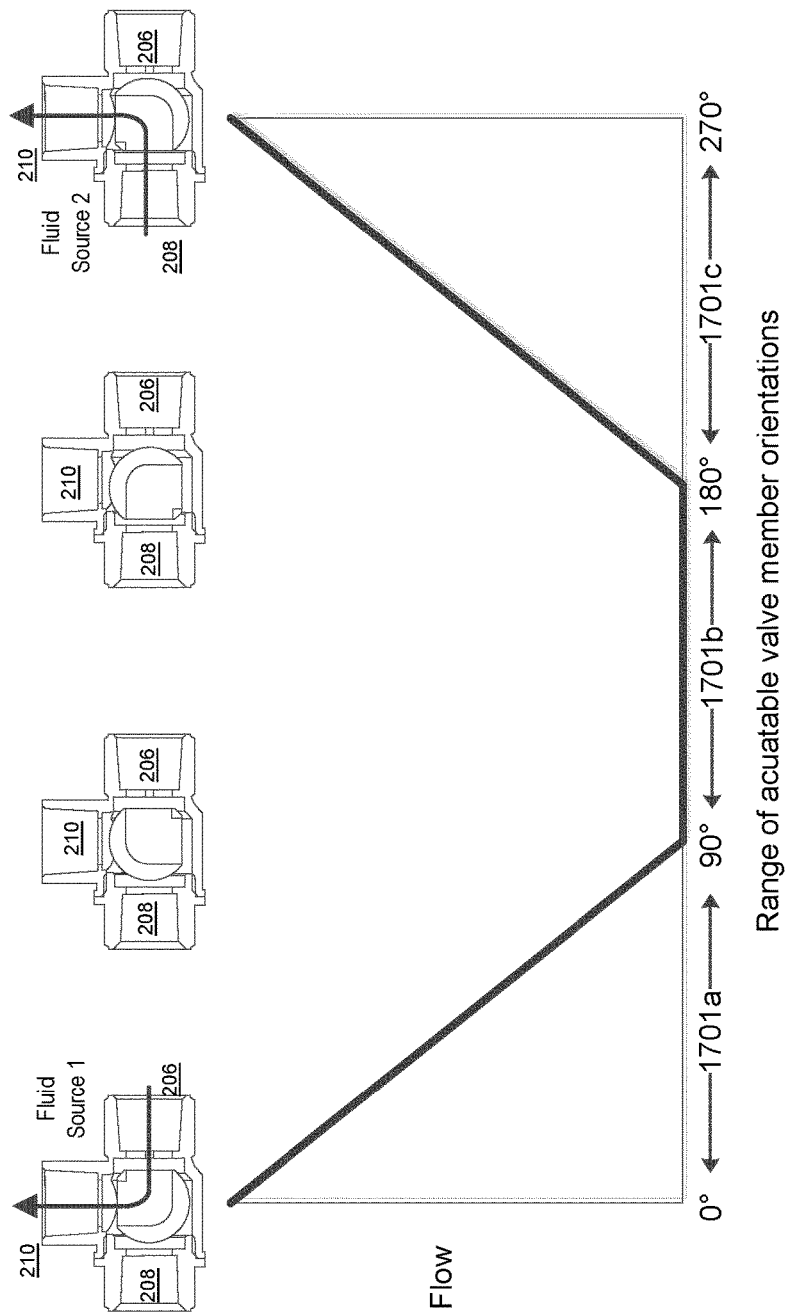
FIG. 17 is a table and diagram representative of the operation of an actuator, according to an exemplary embodiment.

Referring to FIG. 16, an actuator 1200 configured to control flow through the valve 200 responsive to two binary inputs from two different input sources (e.g., from wires that connect the actuator 1200 to a controller 1002) is described according to one embodiment. Similar to the embodiment of FIG. 15, the dual-binary-input actuator 1200 embodiment of FIG. 16 may be configured to control the degree of fluid flow from/to the first fluid source through the valve 200 (either from the first port 206 to the third port 210 as shown in FIG. 16, or from the third port 210 to the first port 206) responsive to an input received from a first input source Y1, and to control the degree of fluid flow from/to the second fluid source through the valve 200 (either from the second port 208 to the third port 210 as shown in FIG. 16, or from the third port 210 to the second port 208) responsive to an input received from a second input source Y2.

As shown by Table 3 below, in such dual-binary input actuator 1200 embodiments as described with reference to FIG. 16, a maximum, or "on" input signal voltage (e.g. 24 VAC) from the first input source Y1 may correspond to a location along the first travel path portion 1601a corresponding to a maximum desired degree of flow through the first port 206. A minimum, or "off" input signal (e.g., 0V) may correspond to a minimum desired degree of flow through the first port 206, which may correspond either to a valve member 204 orientation along the first travel path corresponding to a desired minimum partial flow through the first port 206, or may correspond to the no-flow end position of the first travel path portion 1601a or any other no-flow position (or other position) along the travel path 1601.

A maximum, or "on" input signal voltage from the second input source Y2 (e.g. 24 VAC) may correspond to a location along the third travel path portion 1601c corresponding to a desired degree of flow through the second port 208. A minimum, or "off" input signal (e.g., 0V) may correspond to a minimum desired degree of flow through the second port 208, which may correspond either to a valve member 204 orientation along the third travel path 1601c corresponding to a desired minimum partial flow through the second port 208, or may correspond to the no-flow end position of the third travel path portion 1601c or any other no-flow position (or other position) along the travel path 1601.

As shown in Table 3 below, similar to the actuator 1200 embodiments described with reference to Tables 1 and 2 above, in dual-binary input actuator 1200 embodiments such as, e.g., discussed with reference to FIG. 16, the valve member 204 orientation in a situation in which no input from either the first input source Y1 or the second input source Y2 is received may depend on the last input source Y1 or Y2 that was used to control the operation of the actuator 1200.

For example, as shown by Table 3 below, in some embodiments, to minimize energy usage, the no-input valve member 204 configuration may correspond to a no-flow orientation lying along the second travel path portion 1501b near a first end of the second travel path portion 1501b (i.e., the end of the second travel path portion 1501b closest to the first travel path portion 1501a) if the last input was received from the first input source Y1, while the no-input valve member 204 configuration may correspond to a no-flow orientation lying along the second travel path portion 1501b near a second end of the second travel path portion 1501b (i.e., the end of the second travel path portion 1501b closest to the third travel path portion 1501c) if the last input received was received from the second input source Y2. Alternatively, in some embodiments the no-input valve member orientation may correspond to any desired location on the travel path 901, (e.g. a no-flow valve member orientation equidistant between the first travel path portion 1501a and the third travel path portion 1501c, such as, e.g., 135 degrees).

As the actuator 1200 is not configured to be controlled via simultaneously received non-zero voltage inputs from the first input source Y1 and second input source Y2, as shown by Table 3 below, such a situation is treated as an error situation.

TABLE 3

| | |
|---|---|
| If Y1 Input; No Y2 Input | x = Desired 1st Travel Path Portion Valve Member Orientation |
| If No Y1 Input; No Y2 Input | x = 1st Travel Path Portion 2nd End (If Last Input Source Y1) |
| | x = 3rd Travel Path Portion 1st End (If Last Input Source Y2) OR Travel Path 1st End ≤ x ≤ Travel Path 2nd End |
| If No Y1 Input; Y2 Input | x = Desired 3rd Travel Path Portion Valve Member Orientation |
| If Y1 Input; Y2 Input | Error |

According to some embodiments, additional control over the operation of the actuator 1200 via which the actuator 1200 may drive the valve member 204 to additional locations along the travel path 1601 of the valve 200 may be attained by configuring the actuator 1200 to be responsive to any number of additional binary input signals from any number of additional input sources. As will be understood, in such embodiments, the valve member 204 orientation corresponding to the minimum "off" voltage input from the additional input source and the maximum "on" voltage input from the additional input source may be used to control the actuator 1200 to drive the valve member 204 to any number of different orientations along the travel path 1601.

As described with reference to FIG. 17, according to some embodiments, the actuator 1200 may be configured to operate the valve 200 in response to an analog input received from a single input source (e.g., from a wire that connects the actuator 1200 to a controller 1002). In contrast to the embodiments of FIGS. 15 and 16, in which the actuator 1200 may be configured to independently control the flow of fluid from a first fluid supply through the valve 200 responsive to an input(s) from a first input source Y1 and to independently control the flow of fluid from a second fluid supply through the valve 200 responsive to an input(s) from a second input source Y2, the single analog input actuator 1200 embodiment of FIG. 17 is configured to control of the flow of fluid from each of the first fluid supply and the second fluid supply responsive to a single input Y3. In other words, in contrast to the dual input source actuator 1200 embodiments of FIGS. 15 and 16, in which a first input source Y1 may control movement/rotation of the drive member 204 along a first portion of the travel path 901, and a second input source Y2 may control movement/rotation of the drive member 204 along a second portion of the travel path 901, the single input source Y3 from which input signals are received by the actuator 1200 of the embodiment of FIG. 17 may be used to control movement/rotation of the drive member 204 along the entirety of (or any desired portion of) the travel path 901.

As shown in FIG. 17, in such single, analog input source embodiments, a predetermined minimum input voltage (e.g. 0 or 2 VDC) may correspond to a fully, or partially, open first port 206 configuration defined by a valve member 204 orientation along the first travel path portion 1701a. A predetermined maximum input voltage signal (e.g. 10 VDC) may correspond to a fully, or partially, open second port 208 configuration defined by a valve member 204 orientation along the third travel path portion 1701c.

At input signals from input source Y3 having a voltage that ranges between the minimum input voltage and the maximum input voltage (i.e. at intermediate voltages within the voltage range defined between the minimum input voltage and the maximum input voltage), the actuator 1200 may operate to drive the valve member 204 to any number of valve member 204 orientations defined along the travel path defined by the inputs from the input source Y3 that proportionally correspond to the magnitude of the input voltage received from the input source Y3. For example, as shown in FIG. 17, for a valve 200 defining a 270 degree travel path 1701 in which a minimum input voltage of 0V is corresponds to the first end (i.e. 0 degrees) of the travel path 1701 and a maximum input voltage of 10 VDC corresponds to the second end (i.e. 270 degrees) of the travel path 1701, an intermediate voltage input signal (e.g. 5 VDC) may correspond to a no-flow position of the valve member 204 at between approximately 135 degrees. As discussed above, according to various embodiments, a minimum voltage from the input source Y3 may advantageously correspond to a non-zero voltage signal (e.g. 2 VDC), so as to distinguish a situations in which a 0V, input, is provided to the actuator 1200 intentionally to drive the valve member 204 to the corresponding minimum input orientation from siutations in which an unintentional 0V input (e.g., resulting from improper functioning of the input source Y3, a power failure, etc.) causes the actuator 1200 to drive the valve member 204 to the corresponding minimum voltage orientation. As shown below, the position to which the actuator 1200 will drive the valve member 204 in response to an input voltage from the input source Y3 may be determined as:

$$x = x1 + \frac{\Delta x}{\text{Voltage Range}}(Y3 \text{ voltage} - Y3_{minvoltage})$$

Where:
$\Delta x = x2 - x2$
$x1 = $ 1st TPPR(1−Max Desired 1st Port Flow)
$x2 = $ TTPR−3rd TPPR(1−Max Desired 2nd Port Flow)
TPPR=Travel Path Portion Range
TTPR=Total Travel Path Range With reference to FIGS. 15-17, the various embodiments of controlling an actuator 1200 have been described with reference to the use of the actuator 1200 inputs to effectuate movement of a 270° valve 200 in which a) a 0° rotational orientation of the valve member 204 allows for maximum flow between a first port 206 and a third port 210, b) a rotational positions of the valve member 204 at between approximately 90° and 180° correspond to a no-flow orientations of the valve 200; and c) a rotational position of approximately 2700 of the valve member 204 allows for maximum flow between a second port 208 and the third port 210. However, it is to be understood that according to other embodiments, the various embodiments described with reference to FIGS. 15-17 may additionally, or alternatively, be used to control the valve 200 to effectuate movement of the valve member 204 to any other number of, and combination of, other valve member 204 positions/orientations and/or with valves 200 defining travel paths 901 defining a range other than 270 degrees.

Additionally, although in the embodiments of FIG. 15 each of the first input source Y1 and second input source Y2 are described as providing analog inputs to the actuator 1200, and in the embodiment of FIG. 16 each of the first input source Y1 and second input source Y2 are described as providing binary inputs to the actuator 1200, in other embodiments the actuator 1200 may be configured to control the flow of fluid to/from a first fluid supply using analog inputs (such as, described with reference to FIG. 15), and control the flow of fluid to/from a second fluid supply using binary inputs (such as, e.g., described with reference to FIG. 16). Also, as will be understood, the types of voltage supply (i.e. VDC or VAC) and the minimum/maximum input voltages used in describing the operation of the actuator 1200 in the embodiments of FIGS. 15-17 are intended for illustrative purposes only.

According to various embodiments, an actuator 1200 may be defined by a single operational mode as described in one or more of FIG. 15, FIG. 16 or FIG. 17. However, as noted above, given the variety of different types of outputs provided by different thermostats (or other control devices) with which it may be desired to use the actuator 1200, according to some embodiments, the actuator 1200 may be configured to operate in any one or more of the operational modes described with reference to FIGS. 15-17 and/or in any other operational modes. In some such embodiments, the selection of an operational mode for the actuator 1200 may be based on user input (e.g., via a manual switch provided on the actuator). Alternatively, or additionally, in some embodiments, the actuator 1200 may be configured to detect the type of input(s) being provided from the thermostat/control device, and may automatically select the appropriate operational mode. Additionally, or alternatively, according to various embodiments, the actuator 1200 may be configured to receive user inputs (e.g. via controller and/or via a switch on the actuator 1200) that designate various operational characteristics (such as, e.g., valve member 204 orientation corresponding to minimum/maximum input voltage(s); maximum/minimum degrees of flow through the first port 206 and/or second port 208, etc.).

The construction and arrangement of the systems and methods as shown in the various exemplary embodiments are illustrative only. Although only a few implementations of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited.

Numerous specific details are described to provide a thorough understanding of the disclosure. However, in certain instances, well-known or conventional details are not described in order to avoid obscuring the description. References to "some embodiments," "one embodiment," "an exemplary embodiment," and/or "various embodiments" in the present disclosure can be, but not necessarily are, references to the same embodiment and such references mean at least one of the embodiments.

Alternative language and synonyms may be used for anyone or more of the terms discussed herein. No special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The elements and assemblies may be constructed from any of a wide variety of materials that provide sufficient strength or durability, in any of a wide variety of colors, textures, and combinations. Further, elements shown as integrally formed may be constructed of multiple parts or elements.

As used herein, the word "exemplary" is used to mean serving as an example, instance or illustration. Any implementation or design described herein as "exemplary" is not necessarily to be construed as preferred or advantageous over other implementations or designs. Rather, use of the word exemplary is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary implementations without departing from the scope of the appended claims.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As used herein, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

We claim:
1. A valve assembly comprising:
   a valve body defining:
      a first inlet port, a second inlet port and an outlet port;
      a movable valve member disposed within a space defined between the first inlet port, the second inlet port and the outlet port; and
      a passageway extending through the valve member;
      wherein the valve member is movable along a travel path from a first position on the path in which the first inlet port is in fluid communication with the outlet port and a second position on the path in which the second inlet port is in fluid communication with the outlet port; and
   an actuator comprising:
      a first input connection; and
      a second input connection that is different than the first input connection;
      wherein the actuator is configured to drive the valve member between a plurality of positions including the first position and the second position based on both (1) a first input signal from the first input connection and (2) a second input signal from the second input connection.

2. The valve assembly of claim 1, wherein the actuator is configured to drive the valve member in a first direction in response to the first input signal from the first input connection having a non-zero voltage value and the second input signal from the second input connection having a voltage value of zero, and in a second, different direction, in response to the second input signal from the second input connection having a non-zero voltage value and the first input signal from the first input connection having a voltage value of zero.

3. The valve assembly of claim 2, wherein the actuator is configured to drive the valve member to a third position in which neither the first inlet port nor the second inlet port are in fluid communication with the outlet port.

4. The valve assembly of claim 3, wherein the actuator is configured to move the valve member to the third position in response to both the first input signal and the second input signal having a voltage value of zero.

5. The valve assembly of claim 3, wherein the actuator is configured to drive the valve member to the third position if both the first input signal received from the first input connection and the second input signal from the second input connection received simultaneously by the actuator have non-zero voltage values.

6. The valve assembly of claim 1, wherein the first input signal from the first input connection is received from a first wire and the second input signal from the second input connection is received from a second wire.

7. The valve assembly of claim 1, wherein the actuator is configured to drive the valve member to a third position that is different from the first position in response to the first input signal from the first input connection and the second input signal from the second input connection both having minimum voltage values;
   wherein the first inlet port is in fluid communication with the outlet port in the third position.

8. The valve assembly of claim 7, wherein the first position corresponds to a fully open configuration of the first inlet port and the third position corresponds to a minimally open configuration of the first inlet port.

9. The valve assembly of claim 8, wherein the actuator is configured to drive the valve member to additional positions between the first position and the third position in response to receiving additional input signals from the first input connection; and
   wherein an additional position to which the valve member is driven is proportional to a magnitude of an input signal from the first input connection.

10. A valve assembly comprising:
a valve body defining:
  a first inlet port, a second inlet port and an outlet port;
  a movable valve member disposed within a space defined between the first inlet port, the second inlet port and the outlet port; and
  a passageway extending through the valve member;
  wherein the valve member is movable between a first position in which the first inlet port is in fluid communication with the outlet port, a second position in which the second inlet port is in fluid communication with the outlet port, and a third position in which the first inlet port and the second inlet port are each fully closed; and
an actuator configured to drive the valve member between the first position, the second position, and the third position;
  wherein the actuator is transitionable between a first mode where the actuator drives the valve member based on a single analog control signal, a second mode where the actuator drives the valve member based on a first digital control signal and a second digital control signal, and a third mode where the actuator drives the valve member based on a first analog control signal and a second analog control signal.

11. The valve assembly of claim 10, wherein the first digital control signal and the second digital control signal are received from a single input source.

12. The valve assembly of claim 10, wherein the first digital control signal or the first analog control signal are defined by a first voltage and the second digital control signal or the second analog control signal are defined by a second, different, voltage.

13. The valve assembly of claim 10, wherein the first digital control signal or the first analog control signal is received from a first input source and the second digital control signal or the second analog control signal is received from a second, different, input source.

14. The valve assembly of claim 13, wherein the actuator is configured to control a flow of fluid through the first inlet port exclusively with input signals from the first input source, and to control a flow of fluid through the second inlet port exclusively with input signals from the second input source.

15. The valve assembly of claim 10, wherein the actuator is configured to move the valve member to a fourth position that is different than the third position, wherein the first inlet port and the second inlet port are each fully closed in the fourth position.

16. The valve assembly of claim 15, wherein the actuator is configured to move the valve member along a travel path between each of the first position, second position, third position and fourth position; and
wherein the first inlet port and the second inlet port are each fully closed at valve member positions along the travel path that are located between the third position and the fourth position.

17. The valve assembly of claim 10, wherein the first inlet port is fully open when the valve member is in the first position and the second inlet port is fully open when the valve member is in the second position.

18. A method of actuating a valve comprising:
receiving a first input signal and a second input signal by an actuator;
in response to the first input signal and the second input signal having a first set of values, driving, by the actuator, a valve member along a travel path to a first position in which a passageway extending through the valve member fluidly connects a first inlet port of the valve and an outlet port of the valve; and
in response to the first input signal and the second input signal having a second set of values, driving, by the actuator, the valve member along the travel path from the first position to a second position in which the passageway extending through the valve member fluidly connects a second inlet port of the valve and the outlet port of the valve.

19. The method of claim 18, wherein the first input signal is received from a first input source and the second input signal is received from a second input source that is different from the first input source.

20. The method of claim 18, wherein:
the first position corresponds to a maximum flow configuration of the first inlet port of the valve and is defined by a valve member orientation corresponding to a first end of the travel path, and the second position corresponds to a maximum flow configuration of the second inlet port of the valve and is defined by a valve member orientation corresponding to a second end of the travel path;
wherein the actuator is configured to drive the valve member to one or more additional positions along the travel path in response to additional input signals from an input connection, a position to which the valve member is driven being proportional to a magnitude of a voltage defining an input signal received from the input connection.

* * * * *